US012700814B2

(12) United States Patent
Skellenger et al.

(10) Patent No.: US 12,700,814 B2
(45) Date of Patent: Aug. 4, 2026

(54) SYSTEMS AND METHODS FOR ACTIVE DAMPING IN A STEER-BY-WIRE HANDWHEEL ACTUATOR SYSTEM

(71) Applicant: STEERING SOLUTIONS IP HOLDING CORPORATION, Saginaw, MI (US)

(72) Inventors: Dennis B. Skellenger, Saginaw, MI (US); Steven J. Collier-Hallman, Frankenmuth, MI (US); Mohammad Arifur Rahman, Saginaw, MI (US); Yezan Hussein, Auburn Hills, MI (US); Jevin Barnett, Saginaw, MI (US); Wayne A. Burns, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 154 days.

(21) Appl. No.: 18/532,465

(22) Filed: Dec. 7, 2023

(65) Prior Publication Data

US 2024/0195333 A1 Jun. 13, 2024

Related U.S. Application Data

(60) Provisional application No. 63/593,016, filed on Oct. 25, 2023, provisional application No. 63/462,204, (Continued)

(51) Int. Cl.
*H02P 3/22* (2006.01)
*B62D 5/00* (2006.01)

(52) U.S. Cl.
CPC ............... *H02P 3/22* (2013.01); *B62D 5/003* (2013.01); *H02P 2207/055* (2013.01)

(58) Field of Classification Search
CPC ...... H02P 3/22; H02P 2207/055; B62D 5/003
See application file for complete search history.

(56) References Cited

U.S. PATENT DOCUMENTS

2006/0006899 A1* 1/2006 de Larminat ........... H02P 7/282
324/107
2012/0091792 A1 4/2012 Wu et al.
(Continued)

FOREIGN PATENT DOCUMENTS

DE 102012021391 A1 5/2013
DE 102012105143 A1 12/2013
(Continued)

OTHER PUBLICATIONS

German Patent and Trademark Office, German Office Action for corresponding DE application 10 2023 134 411.0, Oct. 24, 2025, 8 pgs. and English language translation, 8 pgs.

*Primary Examiner* — Zoheb S Imtiaz
(74) *Attorney, Agent, or Firm* — Dickinson Wright PLLC

(57) ABSTRACT

A system for active damping in a steering system includes a multi-phase inverter circuit associated with a motor. The multi-phase inverter circuit includes a power circuit and at least one bipolar junction transistor. The system also includes a processor, and a memory. The memory includes instructions that, when executed by the processor, cause the processor to: receive a torque signal corresponding to a torque applied to a handwheel; generate a damping signal based on the torque signal; and selectively control current flow to the at least one bipolar junction transistor based on the damping signal.

20 Claims, 20 Drawing Sheets

Related U.S. Application Data filed on Apr. 26, 2023, provisional application No. 63/431,632, filed on Dec. 9, 2022.

(56)                References Cited

U.S. PATENT DOCUMENTS

| | | | | |
|---|---|---|---|---|
| 2013/0221888 A1* | 8/2013 | Horikoshi | ................ | H02P 3/22 |
| | | | | 318/400.29 |
| 2014/0077737 A1* | 3/2014 | Zhang | .................... | B60L 15/20 |
| | | | | 318/400.34 |
| 2020/0067400 A1* | 2/2020 | Li | ....................... | H02M 1/4216 |
| 2022/0200503 A1* | 6/2022 | Popek | .................... | B64C 13/50 |

FOREIGN PATENT DOCUMENTS

| | | | |
|---|---|---|---|
| DE | 102019216282 A1 | 6/2020 | |
| DE | 102020006642 A1 | 5/2021 | |
| EP | 4064548 A1 | 9/2022 | |

* cited by examiner

300

302

B

C

NPN

E emf

Current FLOW greater
@ lower speeds
relative to FET

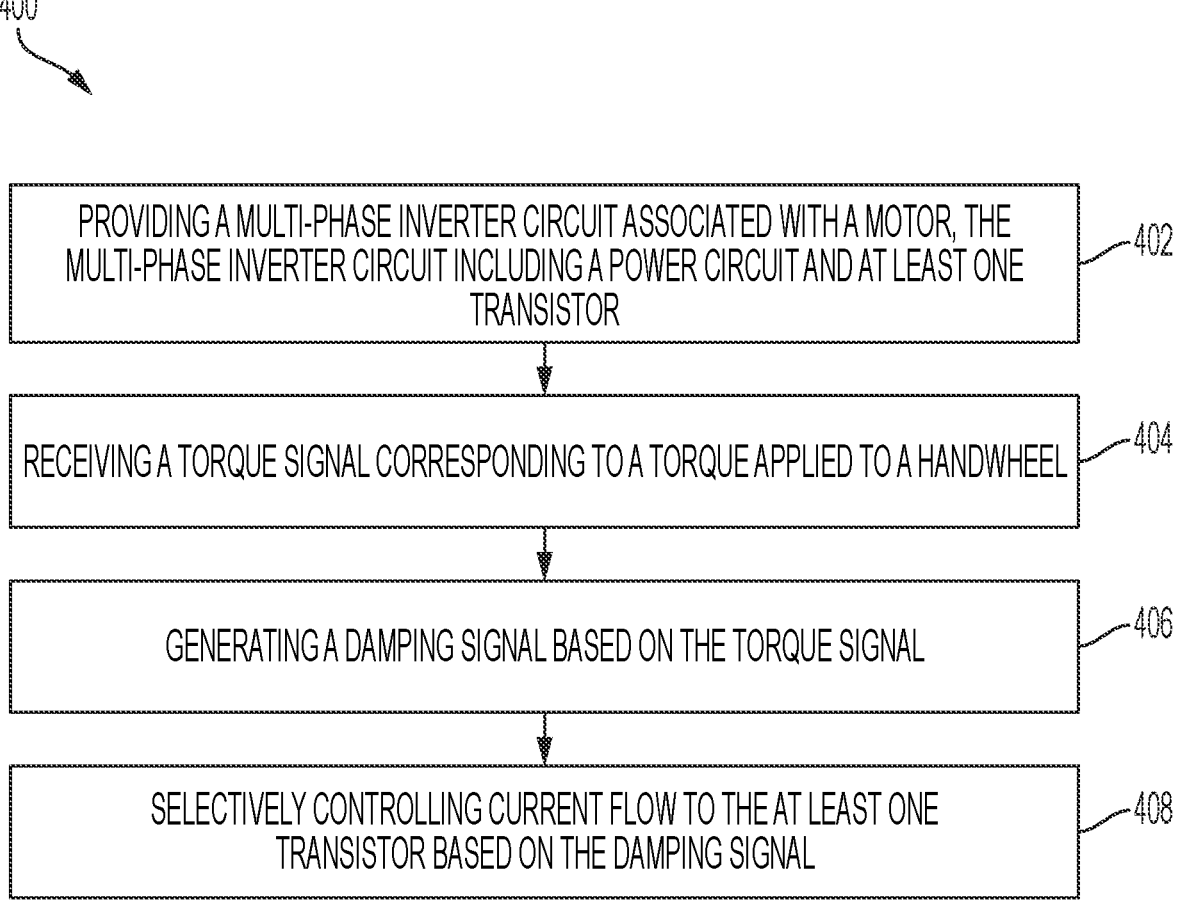

400

PROVIDING A MULTI-PHASE INVERTER CIRCUIT ASSOCIATED WITH A MOTOR, THE MULTI-PHASE INVERTER CIRCUIT INCLUDING A POWER CIRCUIT AND AT LEAST ONE TRANSISTOR — 402

RECEIVING A TORQUE SIGNAL CORRESPONDING TO A TORQUE APPLIED TO A HANDWHEEL — 404

GENERATING A DAMPING SIGNAL BASED ON THE TORQUE SIGNAL — 406

SELECTIVELY CONTROLLING CURRENT FLOW TO THE AT LEAST ONE TRANSISTOR BASED ON THE DAMPING SIGNAL — 408

FIG. 11

SYSTEMS AND METHODS FOR ACTIVE DAMPING IN A STEER-BY-WIRE HANDWHEEL ACTUATOR SYSTEM

CROSS-REFERENCES TO RELATED APPLICATIONS

This U.S. Utility Patent application claims priority to U.S. Provisional Patent Application Ser. No. 63/593,016, filed Oct. 25, 2023; U.S. Provisional Patent Application Ser. No. 63/462,204, filed Apr. 26, 2023 and U.S. Provisional Patent Application Ser. No. 63/431,632, filed Dec. 9, 2022 each of which are incorporated herein by reference their entirety.

TECHNICAL FIELD

This disclosure relates to steering systems and in particular to systems and methods for active damping in a steer-by-wire handwheel actuator system.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

SUMMARY OF THE INVENTION

This disclosure relates generally to vehicle steering systems.

An aspect of the disclosed embodiments includes a system for active damping in a steering system. The system includes at least multi-phase inverter circuit associated with a motor. The multi-phase inverter circuit includes a power circuit and at least one bipolar junction transistor. The system also includes a processor, and a memory. The memory includes instructions that, when executed by the processor, cause the processor to: receive a torque signal corresponding to a torque applied to a handwheel; generate a damping signal based on the torque signal; and selectively control current flow to the at least one bipolar junction transistor based on the damping signal.

Another aspect of the disclosed embodiments includes a method for active damping in a steering system. The method includes providing an multi-phase inverter circuit associated with a motor, the multi-phase inverter circuit including a power circuit and at least one bipolar junction transistor; receiving a torque signal corresponding to a torque applied to a handwheel; generating a damping signal based on the torque signal; and selectively controlling current flow to the at least one bipolar junction transistor based on the damping signal.

Another aspect of the disclosed embodiments includes a system for active damping. The system includes: at least one inverter circuit associated with a motor; the at least one inverter circuit including a power circuit; a damping circuit that includes at least one of a gate drive, a bleeder resistor, and at least one transistor; a processor; and a memory including instructions that, when executed by the processor, cause the processor to: selectively control the damping circuit to provide, using the at least one a low side gate drive, a bleeder resistor, and at least one transistor, damping to an actuator, wherein selectively controlling the damping circuit to provide damping to the actuator includes at least one of: providing at least one signal to the at least one transistor, wherein: the at least one signal corresponds to a duty ratio of the at least one transistor; and disengaging the bleeder resistor Another aspect of the disclosed embodiments includes a method for active damping. The method includes: providing at least one signal to lower transistors (of at least one transistor associated with a multi-phase inverter circuit associated with a motor, wherein: the at least one signal corresponds to a duty ratio of the lower transistors; in response to the duty ratio of the lower transistors being 0 percent, operating the multi-phase inverter circuit as a multi-phase full wave rectifier; in response to the duty ratio of the lower transistors being 100 percent, actively damping energy provided to the multi-phase inverter circuit; and, in response to the duty ratio of the lower transistors being between 0 percent and 100 percent: for lower transistors in an on condition, actively damping energy provided to the multi-phase inverter circuit with the phases of the multi-phase inverter circuit being shorted; and for lower transistors in an off condition, operating the multi-phase inverter circuit as a multi-phase full wave rectifier.

Another aspect of the disclosed embodiments includes an apparatus for active damping. The apparatus includes: a multi-phase inverter circuit associated with a motor; the multi-phase inverter circuit includes a power circuit, a low side gate drive, a bleeder resistor, and at least one transistor; and a controller configured to provide at least one signal to lower transistors of the at least one transistor, wherein: the at least one signal corresponds to a duty ratio of the lower transistors.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 11 is a flow diagram generally illustrating an active damping method according to the principles of the present disclosure.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

Due to the groundbreaking innovations in electrical machines, sensors, power electronics, and motor control algorithms in recent decades, the EPS system has increasingly been used an alternative to the conventional hydraulic power steering (HPS) system. However, the intermediate shaft in the EPS system is structurally sensitive if there is any crash. The absence of the intermediate shaft in SbW systems provide a way to overcome this issue. Moreover, the SbW system is a direct evolution of the EPS, and may be adapted for autonomous vehicle operation.

Figure 3:
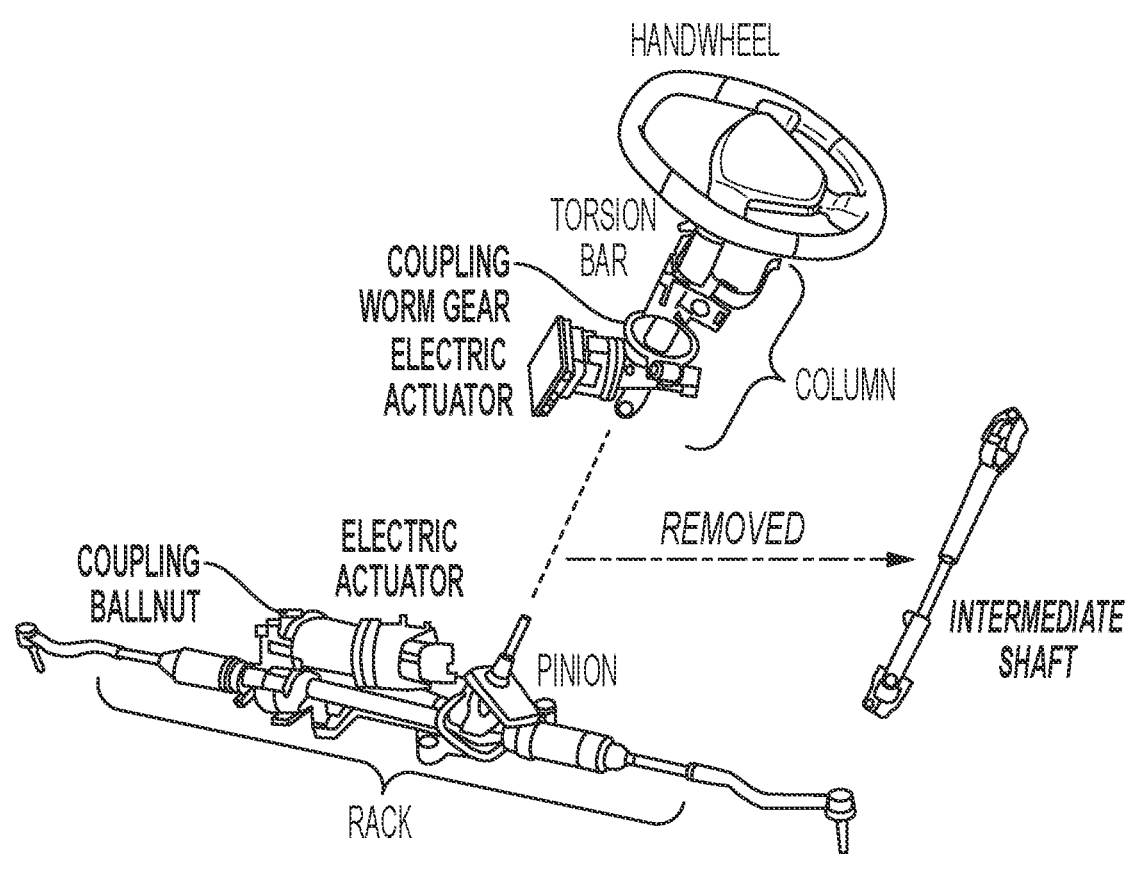
FIG. 3 generally illustrates a steering system according to the principles of the present disclosure.

As is generally illustrated in FIG. 3, a SbW system may provide freedom in placement of the of the steering wheel sub systems in relation to the rack. However, in an SbW system, if a fault occurs or power is lost in the handwheel sub system, the driver loss of feedback will be undamped and may become a stability control issue with the position tracking of the rack. The absence of any mechanical interface between the handwheel and rack subsystems may create an operating hazard if not accounted for.

Typically, to alleviate this problem, damping is added by either using a passive strategy or using an active control strategy. In the passive damping strategy, at least some of the motor phases may be permanently shorted to cause braking torque during the failure condition. However, this braking torque also exists while the system is working in the normal mode of operation. Therefore, the motor must actually be oversized to power through the damping torque. In addition, extra energy from the battery is needed during the normal operation in the first or the third quadrant. The dedicated winding in the shorted condition also requires extra space inside the motor.

Alternatively, instead of using a permanently shorted winding, the existing inverter can be used along with minimal added components to operate in such a way that it also creates the required damping to meet the specification. Since active switches are employed in this method it may be defined as an active damping strategy. A concern with active damping is that power is required from the battery to operate. In a power failure scenario, the system may not be operational and, accordingly, the damping aspects may not be present.

Accordingly, systems and methods, such as those described herein, configured to provide battery independent active damping, may be desirable. In some embodiments, the systems and methods described herein may be configured to provide an active control strategy that utilizes motor back electromotive force (BEMF) energy to generate the damping. Additionally, or alternatively, the systems and methods described herein may be configured to avoid the issues with passive damping strategy. The systems and methods described herein may be configured to provide active damping strategies where the energy to operate the MOSFETs and sub-circuits are harnessed from the BEMF of the machine.

In some embodiments, the systems and methods described herein may be configured to use BEMF generated energy to create active damping in the SbW handwheel actuator (HWA) motor by shorting (e.g., energizing) the lower MOSFETs in an inverter, using existing windings for normal operating conditions creating the damping during the failure conditions. The systems and methods described herein may be configured to provide a higher degree of freedom to achieve the desired torque. The systems and methods described herein may be configured to use a switching frequency, duty ratio of the lower MOSFETs, and the value of the bleeder resistance to provide more freedom to optimize the overall design to achieve the damping.

The systems and methods described herein may be configured to use a common inverter as the rectifier for the motor BEMF to produce a power supply to the circuit. The systems and methods described herein may be configured to use BEMF generated energy to turn ON the lower MOS-FETs of the inverter through parallel gate drivers to create damping by shorting the motor during the OFF conditions. The systems and methods described herein may be configured to provide a circuit for disabling the entire function during the "ON" state when the SbW system is operating in its "Normal" mode.

The systems and methods described herein may be configured to use the same windings of the motor for generating the braking torque as used in the Normal mode (e.g., no extra winding set is used for creating the damping and a much smaller and cheaper motor may be used). The systems and methods described herein may be configured to use the inverter as a rectifier to indicate a voltage proportional to speed that will allow for increased or decreased damping. The systems and methods described herein may be configured to add a switched bleeder resistor across the inverter bridge to protect the MOSFETs and bulk capacitor from overvoltage and to circulate the currents to provide damping. The bleeder resistor circuit may be switched off during the dynamic braking when the lower MOSFETs are commanded to reduce dissipation in the bleeder.

The systems and methods described herein may be configured to configure a bleed resistor to achieve the appropriate damping and reduce the power dissipation for cheaper components and use less physical layout space. The systems and methods described herein may be configured to configure the bleed resistor to provide all the systems damping using a selected wattage rating to dissipate the energy. The systems and methods described herein may be configured to switch in and out different bleed resistors to produce enhanced damping throughout the speed range.

The systems and methods described herein may be configured to use added circuitry to control the MOSFET drivers. Circuitry may be capable of various frequencies and duty cycle pulse width modulation (PWM). The systems and methods described herein may be configured to use various combinations of duty ratio for the lower MOSFETs of the inverter for a fixed switching frequency to produce tunability of the damping torque through the motor speed range. The systems and methods described herein may be configured to use various combinations of switching frequencies for the lower MOSFETs of the inverter for a fixed duty ratio for NVH, efficiency and better low handwheel speed damping performance.

The systems and methods described herein may be configured to use a disconnect mechanism from the battery so that the battery does not clamp the rectified BEMF voltage and create unwanted added damping. The systems and methods described herein may be configured to configure a gate drive current/resistance so that the SbW system may overdrive the damping circuits on the lower MOSFETs in normal mode through the standard gate driver.

In some embodiments, the systems and methods described herein may be configured to use a multi-phase inverter circuit associated with a motor. The multi-phase inverter circuit may include a three-phase inverter circuit and/or any other suitable multi-phase invertor circuit. The multi-phase inverter circuit may include a power circuit, a low side gate drive, a bleeder resistor, and at least one MOSFET. The system may also include a processor and a memory. The memory includes instructions that, when executed by the processor, cause the processor to: provide at least one signal to lower MOSFETs of the at least one MOSFET. The at least one signal corresponds to a duty ratio of the lower MOSFETs. In response to the duty ratio of the lower MOSFETs being 0 percent, the multi-phase inverter circuit operates as a multi-phase full wave rectifier. In response to the duty ratio of the lower MOSFETs being 100 percent, the multi-phase inverter circuit actively damps energy provided to the multi-phase inverter circuit with all three phases of the multi-phase inverter circuit being shorted, for example, either directly or through the MOSFET body diodes. In response to the duty ratio of the lower MOSFETs being between 0 percent and 100 percent: for lower MOSFETs in an on condition, the multi-phase inverter circuit actively damps energy provided to the multi-phase inverter circuit with all three phases of the multi-phase inverter circuit being shorted; and for lower MOSFETs in an off condition, the multi-phase inverter circuit operates as a multi-phase full wave rectifier.

In some embodiments, the multi-phase inverter circuit is associated with a steering system of a vehicle. In some embodiments, the steering system includes a SbW steering system. In some embodiments, the motor includes a permanent magnet synchronous machine. In some embodiments, the permanent magnet synchronous machine includes a surface mounted permanent magnet machine.

Figure 6:
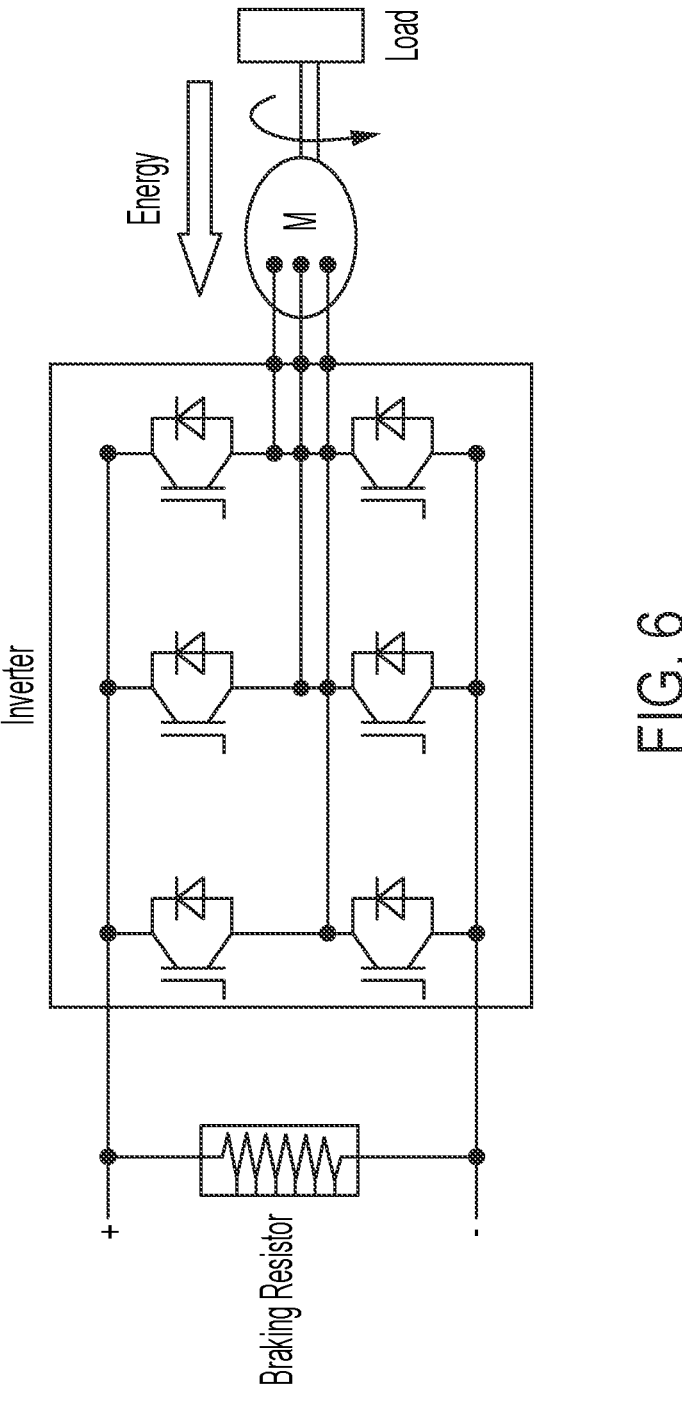
FIG. 6 generally illustrates a circuit diagram of an alternative active damping system according to the principles of the present disclosure.

Typically, in SbW systems, the HWA emulates road feel with the motor providing feedback to the driver, simulating friction and wheels on the ground feel. If the motor fails or a fault occurs in the motor, a back-up redundant system typically operates to keep feel and prevent the handwheel from spinning, desynchronizing with the roadwheel actuator (RWA). Typically, vehicle systems provide off state damping, where, essentially, a load is sunk as the motor (e.g., or generator) operates in quadrant 4 providing a negative torque opposing driver input, as intended. The load is placed in parallel with the motor, as is generally illustrated in FIG. 6, where a load magnitude is directly proportional to damping.

At lower speeds (e.g., 50-200 revolutions per minute (RPM) of the motor), the output EMF is typically less than 5V (e.g., at or near a 1-2V range). In such cases, a MOSFET may not conduct (e.g., because the resistance of the drain-source channel, as the lower gate-to-source voltages approaches high magnitudes, approach lower Vgs).

Figure 8:
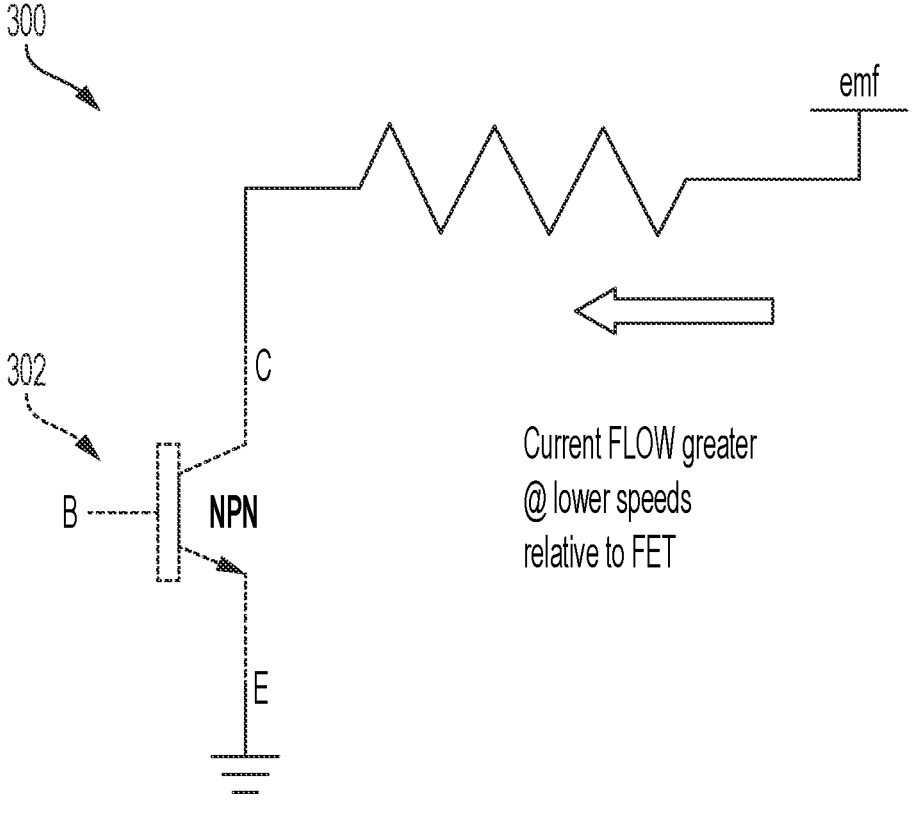
FIG. 8 generally illustrates a circuit diagram of an alternative active damping system according to the principles of the present disclosure.

Accordingly, as is generally illustrated in FIG. 8, the systems and methods described herein may be configure to implement circuit 300 including a bipolar junction transistor (BJT) 302, such as a negative-positive-negative (NPN) BJT transistor, or other suitable BJT or other suitable transistor. The BJT 302 may include a multi-terminal (e.g., a base terminal, a collector terminal, and an emitter terminal) semiconductor device having two p-n junctions to amplify a signal.

Figure 7:
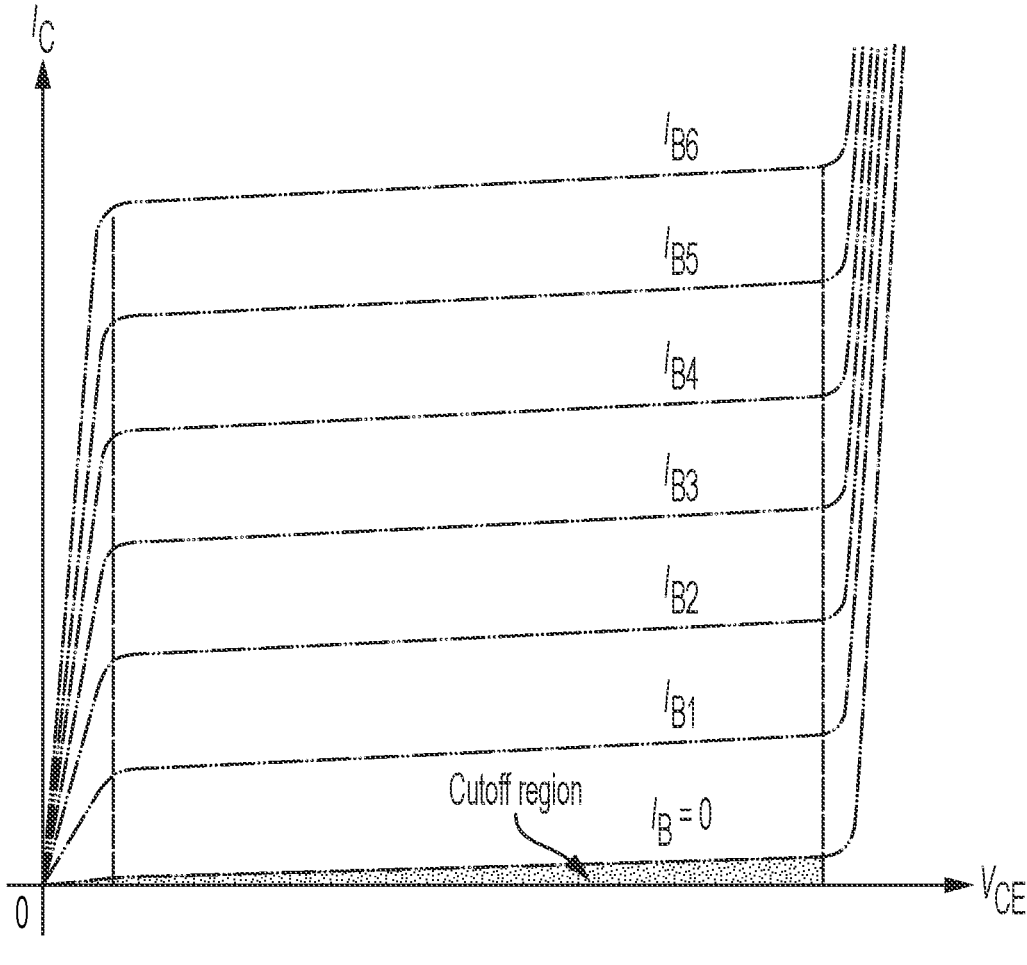
FIG. 7 generally illustrates a chart illustrating current curves according to the principle of the present disclosure.

As is generally illustrated in FIG. 7, a higher base current is sunk into the base results in a sharper slope for a given curve (e.g., at a given load line q-point, the transistor operates deeper in the saturation region, decreasing collector-emitter voltage drop and operating more towards an ideal switch).

The systems and methods described herein may be configured to provide a circuit that conducts at quicker or sooner than a typical normal level MOSFETs. The systems and methods described herein may be configured to provide damping feedback at relatively lower handwheel speeds.

In some embodiments, the systems and methods described herein may be configured to providing damping output at relatively lower handwheel speeds. The systems and methods described herein may be configure to provide damping at lower speeds using a BJT (e.g., current controlled) switch. Typically, a MOSFET has a gate-source voltage threshold that allows the channel of the MOSFET to begin to open up (e.g., less resistance). Most normal level FETs' Vgs(th) is approximately 2-4V. This means at least 2-4V are applied to the MOSFET to begin to open up the conduction drain-to-source channel of the MOSFET, and most manufacturers define the threshold point where the drain current conducting is ~250 uA at Vgs(th), which may make conduction at relatively low handwheel speeds difficult, since speed is directly proportional to back EMF (e.g., at the lower speeds the back EMF is relatively lower for a given Ke motor).

Figure 9:
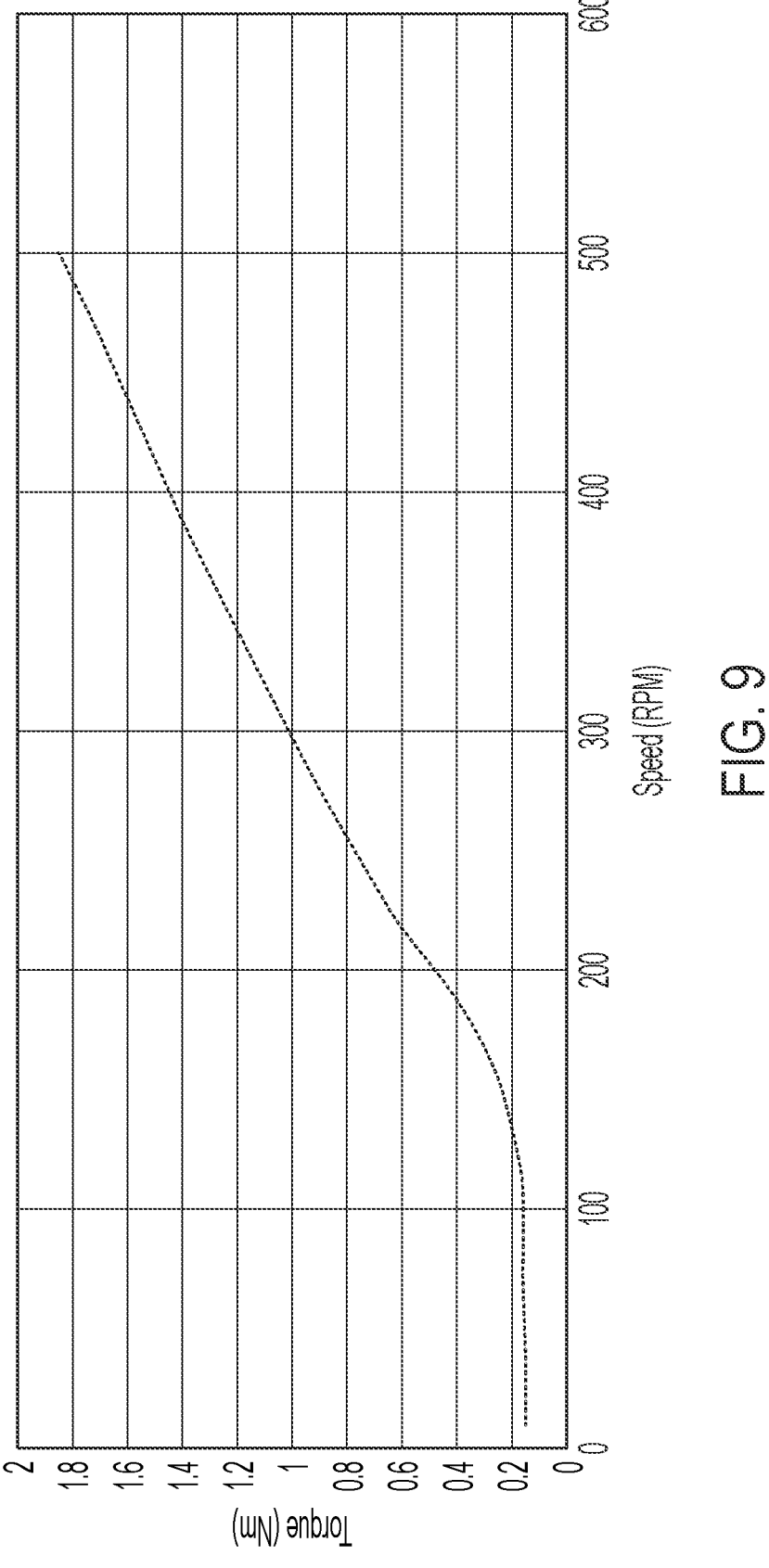
FIG. 9 generally illustrates a chart illustrating handwheel torque over various motor speeds according to the principle of the present disclosure.
Figure 10:
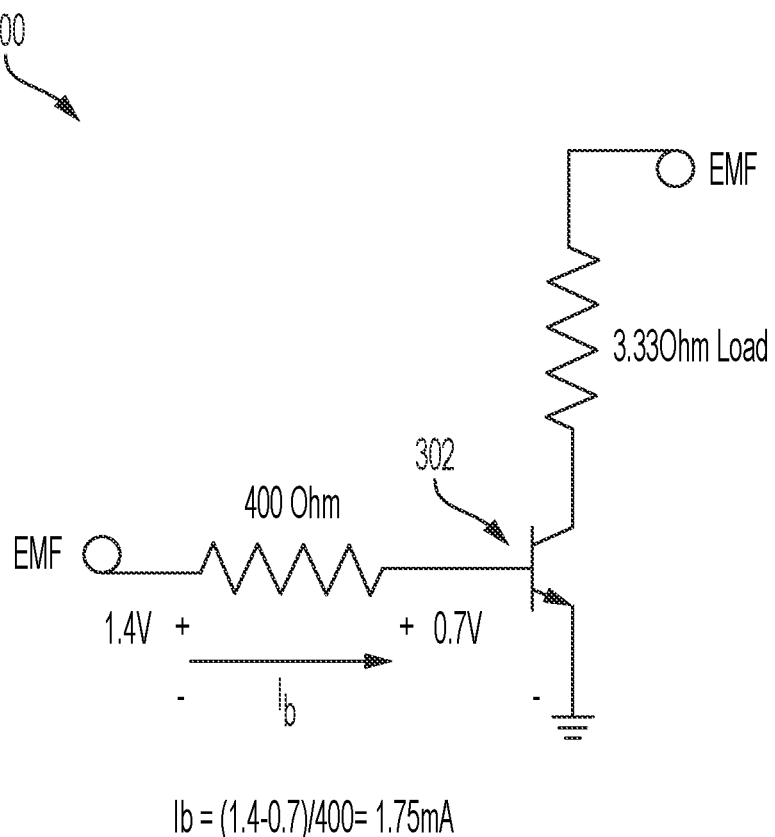
FIG. 10 generally illustrates a circuit diagram of an alternative active damping system according to the principles of the present disclosure.

As is generally illustrated in FIG. 9, at lower speeds the torque output favorable, using the BJT 302 as bleed switch, which may switch on the load sooner at slower speeds due to current control of the BJT 302. With reference to FIG. 10, at 200 RPM of the motor, the circuit 300 may generate 2V (e.g., with some of the voltage dropped across the rectification diode), such that the input to the BJT 302 is roughly 1.4V (e.g., when the circuit incudes a 400 Ohm resistor used as a base current limiter). With a DC current gain Hfe of 150, then the current Ic is Hfe times Ib (e.g., therefore the collector current is roughly around 263 mA at the lower currents, which provides damping).

In some embodiments, the systems and methods described herein may be configured to use a BJT, such as the BJT 302, (current controlled transistor) to provide adequate damping at the lower speeds (e.g., 100-400 RPM) where lower voltages are generated. The systems and methods described herein may be configured conduct more current at a lower input voltage as became the BJT 302 is not bound by an initial voltage threshold of a MOSFET.

In some embodiments, the systems and methods described herein may be configured to use a multi-phase inverter circuit associated with a motor. The multi-phase inverter circuit includes a power circuit and at least one BTJ, such as an NPN BJT or other suitable transistor. The systems and methods described herein may be configured to receive a torque signal corresponding to a torque applied to a handwheel. The systems and methods described herein may be configured to generate a damping signal based on the torque signal. The systems and methods described herein may be configured to selectively control current flow to the at least one BJT based on the damping signal.

In some embodiments, a permanent magnet synchronous motor (PMSM) based SbW system may be configured to create a circular motion on the rotor will create a BEMF, where the magnitude of the BEMF depends on the speed of the circular motion. If the handwheel rotates on a SbW system, it may create the similar BEMF with the motor speed proportional to the gear ratio of the handwheel. Damping through a bleed resistor may be present and proportional to the current through the bleed resistor.

In some embodiments, the systems and methods described herein may be configured to provide faulted state damping for handwheel actuators. The systems and methods described herein may be configured to provide base damping (e.g., which may be enabled by default and turned off by a corresponding processor during normal operation) using external power, a load circuit, motor damping through rectification, and a battery disconnect.

The systems and methods described herein may be configured to provide back EMF powered damping that includes features similar to base damping with a load circuit activated by back EMF power of the motor and/or by rectified back EMF. The systems and methods described herein may be configured to provide dual mode damping using battery power and back EMF power. The systems and methods described herein may be configured to provide multi-controller base damping on a multiphase set motor, with one or more processors (e.g., or controllers) being configured to disable the bleeder switch.

The systems and methods described herein may be configured to provide multi-controller base damping on a multiphase set motor, with one or more processors (e.g., or controllers) being configured to disable the bleeder switch, multiple batteries provide powering circuit with or without back EMF powering circuit or without battery power. The systems and methods described herein may be configured to provide multi-controller back EMF damping on a multiphase set motor, with back EMF from other phases rectified for activation at lower speeds. The systems and methods described herein may be configured to provide tunable damping including PWM on low side inverter switches with higher damping resistance.

The systems and methods described herein may be configured to provide direct phase shorting with back EMF power. All modes with circuitry, described herein, may be added for DFMEA (e.g., with no impact on base functionality).

In some embodiments, the systems and methods described herein may be configured to provide base damping including power from one or more batteries, a low current draw circuit by lack of pulldown resistor, full enhancement of transistors for maximum damping, a load circuit and control for damping tuning of curve accomplished by bleed resistor choice which sets damping current over speed, a battery disconnect (e.g., which enables disconnect of power supply in view of failure issues, and disconnects loading and damping when the back EMF is greater than the power supply voltage). In some embodiments, the processor/controller may overdrive the circuit for normal operation, with a default state being damping enabled.

In some embodiments, the systems and methods described herein may be configured to provide back EMF powered damping that includes power from back EMF and a low current draw circuit by lack of pulldown resistor. The systems and methods described herein may be configured to omit the battery (e.g., which does not remove damping. The systems and methods described herein may be configured to provide a load circuit and control for damping. The systems and methods described herein may be configured to accomplish tuning of the curve by choosing bleed resistor which sets damping current over speed. The systems and methods described herein may be configured to provide a battery disconnect, which may enable disconnect of power supply failure issues. The systems and methods described herein may be configured to disconnect loading and damping when back EMF is greater than the power supply voltage. The systems and methods described herein may be configured to using the controller to overdrive the circuit for normal operation, with a default state being damping enabled.

The systems and methods described herein may be configured to use internal motor back EMF power to switch a resistive load into the rectification path of the inverter to cause damping as a function of handwheel speed in a SbW handwheel system to enable safe operation of the SbW system in case of failure of the controller.

The systems and methods described herein may be configured to use a battery disconnect circuit for the inverter to limit power dissipation in the load resistance and to prevent loading of the battery when back EMF is greater than the battery voltage. The systems and methods described herein may be configured to overdrive the switch of the load circuit to prevent activation when the controller is in normal operation.

In some embodiments, the systems and methods described herein may be configured to provide dual mode damping using battery power and back EMF power. The systems and methods described herein may be configured to use external power and internal motor back EMF power to switch a resistive load into the rectification path of the inverter to cause damping as a function of handwheel speed in a SbW handwheel system to enable safe operation of the SbW system in case of failure of the controller. The systems and methods described herein may be configured to use a battery disconnect circuit for the inverter to limit power dissipation in the load resistance and to prevent loading of the battery when back EMF is greater than the battery voltage. The systems and methods described herein may be configured to overdrive the switch of the load circuit to prevent activation when the controller is in normal operation.

In some embodiments, the systems and methods described herein may be configured to provide multi controller based damping on multiphase set motors (e.g., damping on one phase set only, damping on multiple phases, damping on both controllers, and/or the like). The systems and methods described herein may be configured to, for a multiphase motor with multiple controllers, use external power and Internal motor back EMF power to switch a resistive load into the rectification path of one inverter to cause damping as a function of handwheel speed in a SbW handwheel system to enable safe operation of the SbW system in case of failure of the controller. The systems and methods described herein may be configured to use battery disconnect circuits for the inverters to limit power dissipation in the load resistance and to prevent loading of the battery when back EMF is greater than the battery voltage. The systems and methods described herein may be configured to override the switch of the load circuit from any controller to prevent activation when the said controller is in normal operation.

In some embodiments, the systems and methods described herein may be configured to, for a multiphase set motor with multiple controllers. Using either external power or either motor phase set for back EMF power to switch a resistive load into the rectification path of either inverter to cause damping as a function of handwheel speed in a SbW handwheel system to enable safe operation of the SBW system in case of failure of the controller. The systems and methods described herein may be configured to use battery disconnect circuits for the inverters to limit power dissipation in the load resistance and to prevent loading of the battery when back EMF is greater than the battery voltage. The systems and methods described herein may be configured to override the switch of the load circuit by either controllers to prevent activation when the controller is in normal operation.

In some embodiments, the systems and methods described herein may be configured to provide bleeder activation of a second inverter using back EMF power. The systems and methods described herein may be configured to provide improved damping at low speed (e.g., because the bleeder does not affect the rectifier voltage). The systems and methods described herein may be configured to allow multiple controls to shut off damping. The systems and methods described herein may be configured to use internal motor back EMF power from rectification of one inverter to switch a resistive load into the rectification path of a different inverter to cause damping as a function of handwheel speed in a SbW handwheel system to enable safe operation of the SbW system in case of failure of the controller. The systems and methods described herein may be configured to use battery disconnect circuits for the inverters to limit power dissipation in the load resistance and to prevent loading of the battery when back EMF is greater than the battery voltage. The systems and methods described herein may be configured to override the switch of the load circuit from either controller to prevent activation when the controller is in normal operation.

In some embodiments, the systems and methods described herein may be configured to provide a tunable damping curve, which may include a PWM circuit for low side transistors to add tuning capability to meet the specified damping curve. The systems and methods described herein may be configured to use a bleeder resistor to reduce high voltages due to recycle currents which would cause damage to transistors. The systems and methods described herein may be configured to use a relatively higher resistance bleed resistor, which may be optimized for lower dissipation in the bleeder resistor.

In some embodiments, the systems and methods described herein may be configured to use battery power and/or multiset phases and controllers.

In some embodiments, the systems and methods described herein may be configured to provide direct phase shorting with back EMF power. The systems and methods described herein may be configured to provide a low current draw circuit by omitting a pulldown resistor. The systems and methods described herein may be configured to omit the battery, without removing damping. The systems and methods described herein may be configured to provide a load circuit and control for damping. The systems and methods described herein may be configured to provide tuning of the curve using direct phase shorting resistor choice, which may set damping current over speed. The systems and methods described herein may be configured to use a battery disconnect. The systems and methods described herein may be configured to enable disconnecting of the power supply failure issues. The systems and methods described herein may be configured to disconnect loading and damping when back EMF is greater than the power supply voltage. The systems and methods described herein may be configured to overdrive the circuit normal operation (e.g., where the default state is damping enabled). The systems and methods described herein may be configured to provide improved damping using direct phase shorting.

Figure 12:
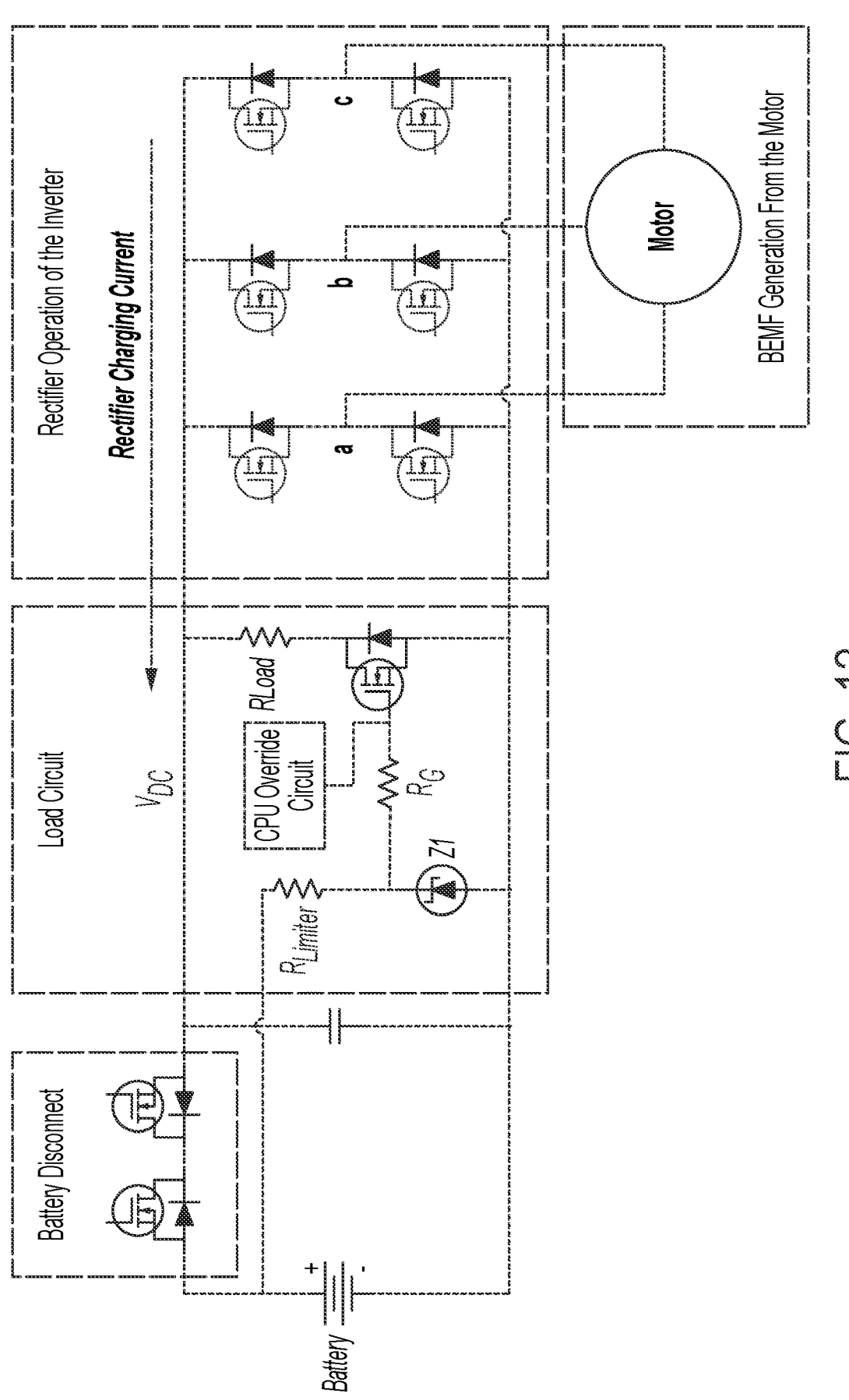
FIG. 12 generally illustrates a circuit diagram of an alternative active damping system according to the principles of the present disclosure.
Figure 13:
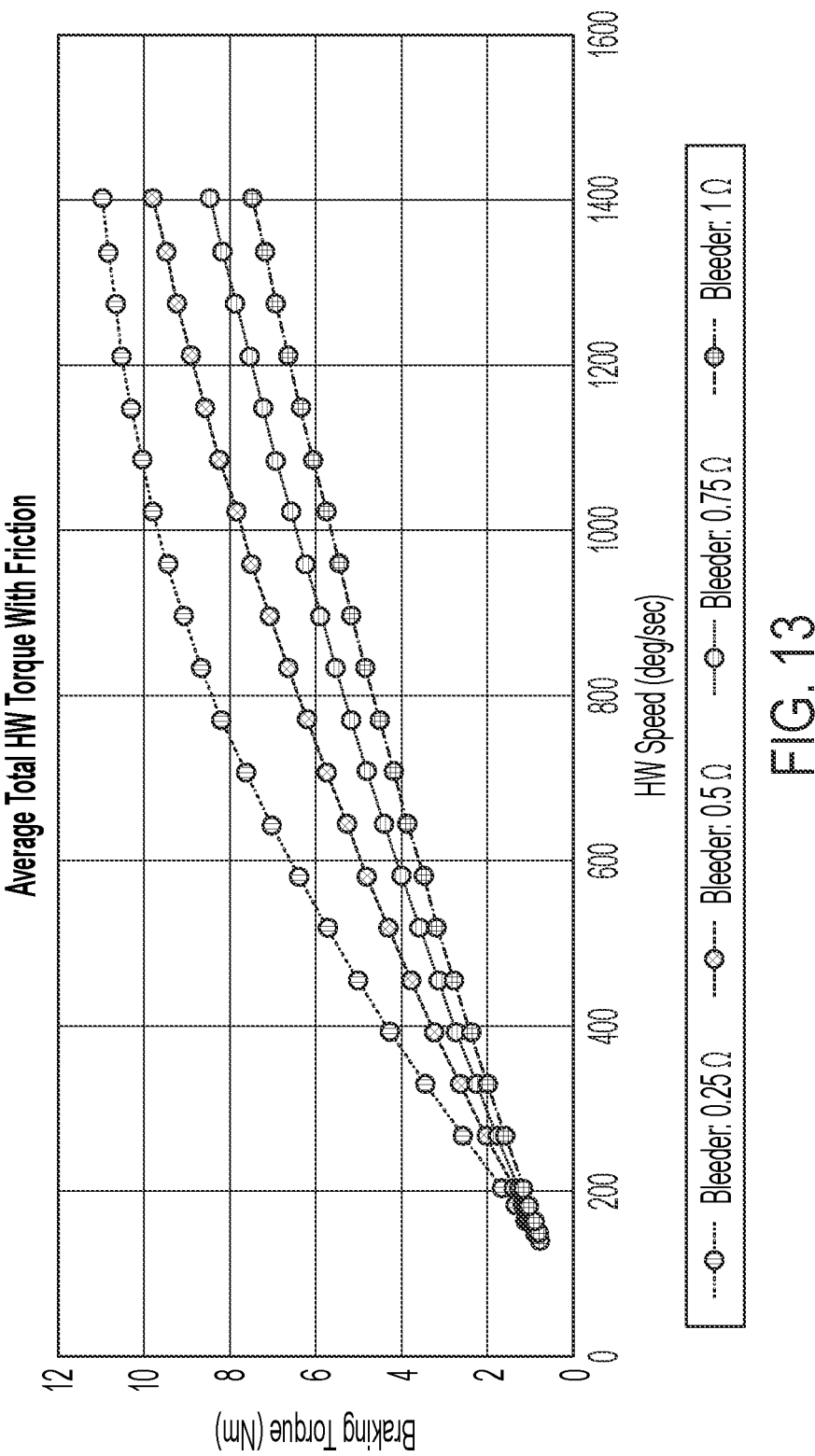
FIG. 13 generally illustrates a chart illustrating curves according to the principle of the present disclosure.

In some embodiments, and with reference to FIGS. 12 and 13, the systems and methods described herein may be configured to receive power from a battery. The systems and methods described herein may be configured to omit the pulldown resistor to provide a low current draw circuit. The systems and methods described herein may be configured to maximize or improve damping using the battery to enable full enhancement of the transistor. The systems and methods described herein may be configured to provide a load circuit and control for damping. The systems and methods described herein may be configured to provide tuning of the curve by using a bleed resistor choice, which may set damping current over speed. The systems and methods described herein may be configured to provide a battery disconnect. The systems and methods described herein may be configured to enable disconnect of power supply failure issues. The systems and methods described herein may be configured to disconnect loading and damping when back EMF is greater than the power supply voltage. The systems and methods described herein may be configured to overdrive the circuit for normal operation (e.g., where the default state is damping enabled).

The systems and methods described herein may be configured to use external power to switch a resistive load into the rectification path of the inverter to cause damping as a function of handwheel speed in a SbW handwheel system to enable safe operation of the SbW system in case of failure of the controller. The systems and methods described herein may be configured to use a battery disconnect circuit for the inverter to limit power dissipation in the load resistance and to prevent loading of the battery when back EMF is greater than the battery voltage. The systems and methods described herein may be configured to overdrive the switch of the load circuit to prevent activation when the controller is in normal operation.

Figure 14:
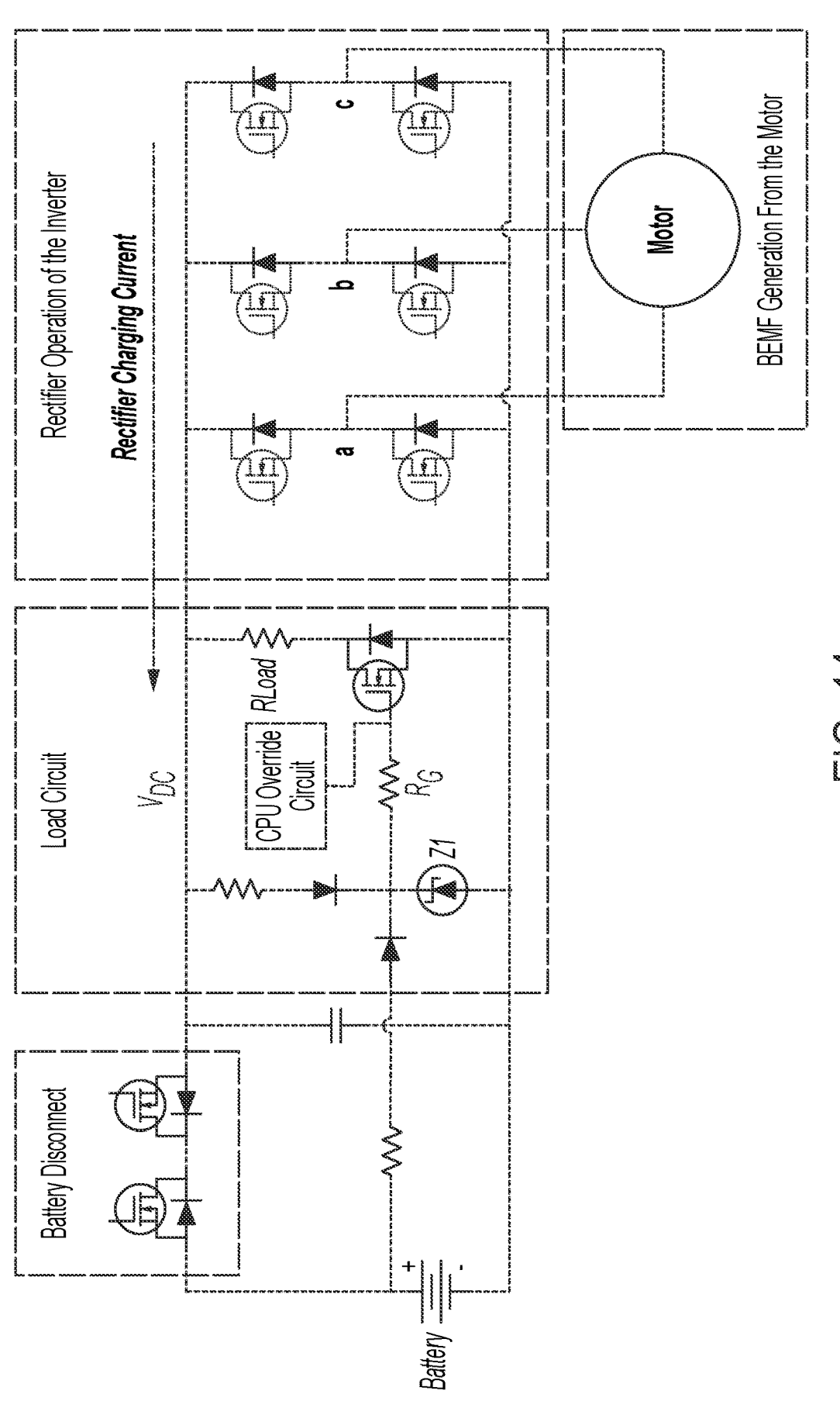
FIG. 14 generally illustrates a circuit diagram of an alternative active damping system according to the principles of the present disclosure.

With reference to FIG. 14, the systems and methods described herein may be configured to provide dual mode damping using battery power and back EMF power. The systems and methods described herein may be configured to use external power and internal motor back EMF power to switch a resistive load into the rectification path of the inverter to cause damping as a function of handwheel speed in a SbW handwheel system to enable safe operation of the SbW system in case of failure of the controller. The systems and methods described herein may be configured to use a battery disconnect circuit for the inverter to limit power dissipation in the load resistance and to prevent loading of the battery when back EMF is greater than the battery voltage. The systems and methods described herein may be configured to overdrive the switch of the load circuit to prevent activation when the controller is in normal operation.

Figure 15:
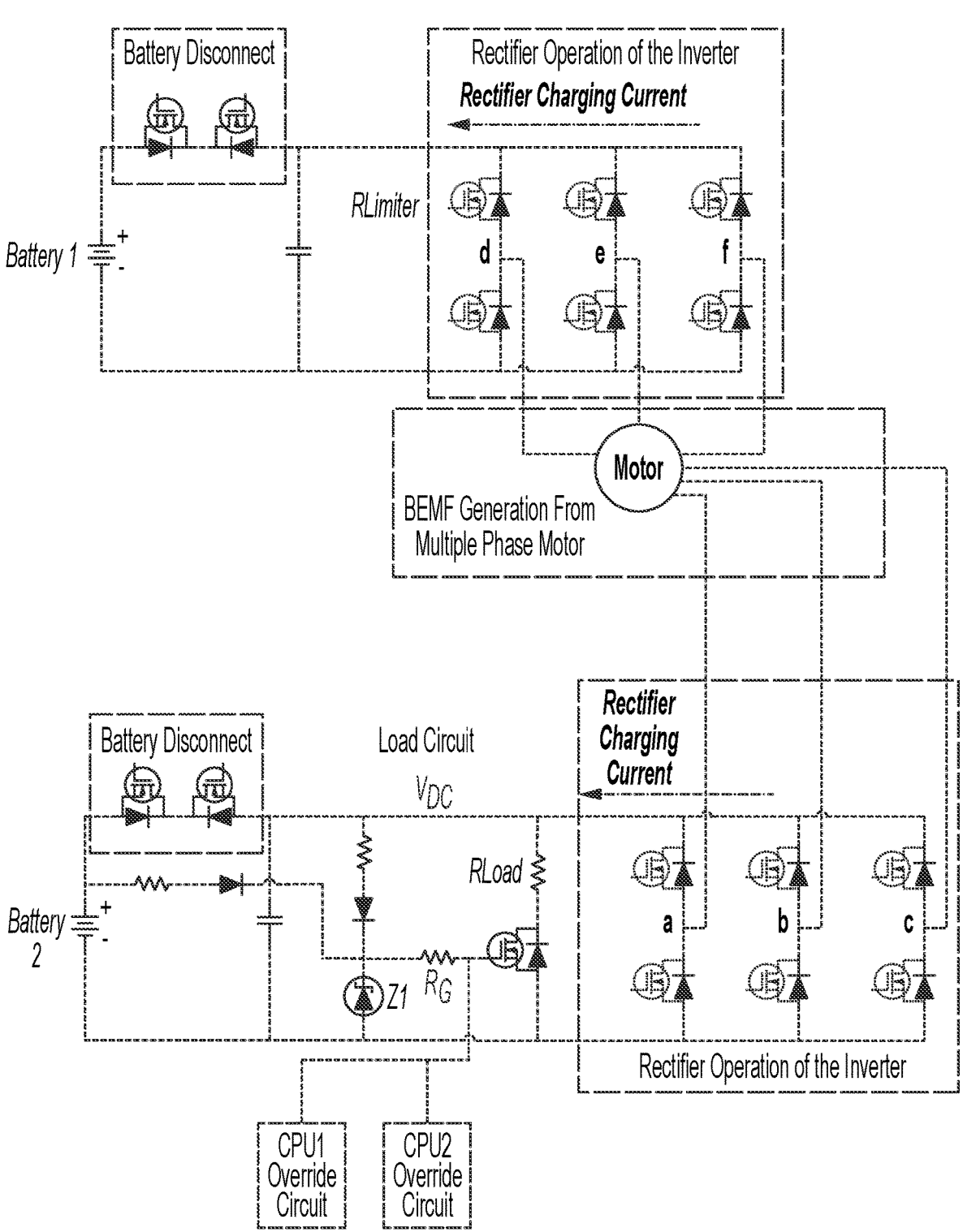
FIG. 15 generally illustrates a circuit diagram of an alternative active damping system according to the principles of the present disclosure.

With reference to FIG. 15, the systems and methods described herein may be configured to use multiple controllers to provide base damping on multiphase set motor. For example, the systems and methods described herein may be configured to provide damping on one phase set only, with both controllers bypassed and configured to shut off damping for motor operation. The systems and methods described herein may be configured to use a multiphase motor with multiple controllers. The systems and methods described herein may be configured to use external power and internal motor back EMF power to switch a resistive load into the rectification path of one inverter to cause damping as a function of handwheel speed in a SbW handwheel system to enable safe operation of the SbW system in case of failure of the controller. The systems and methods described herein may be configured to use battery disconnect circuits for the inverters to limit power dissipation in the load resistance and to prevent loading of the battery when back EMF is greater than the battery voltage. The systems and methods described herein may be configured to overdrive the switch of the load circuit from any controller to prevent activation when the said controller is in normal operation.

Figure 16:
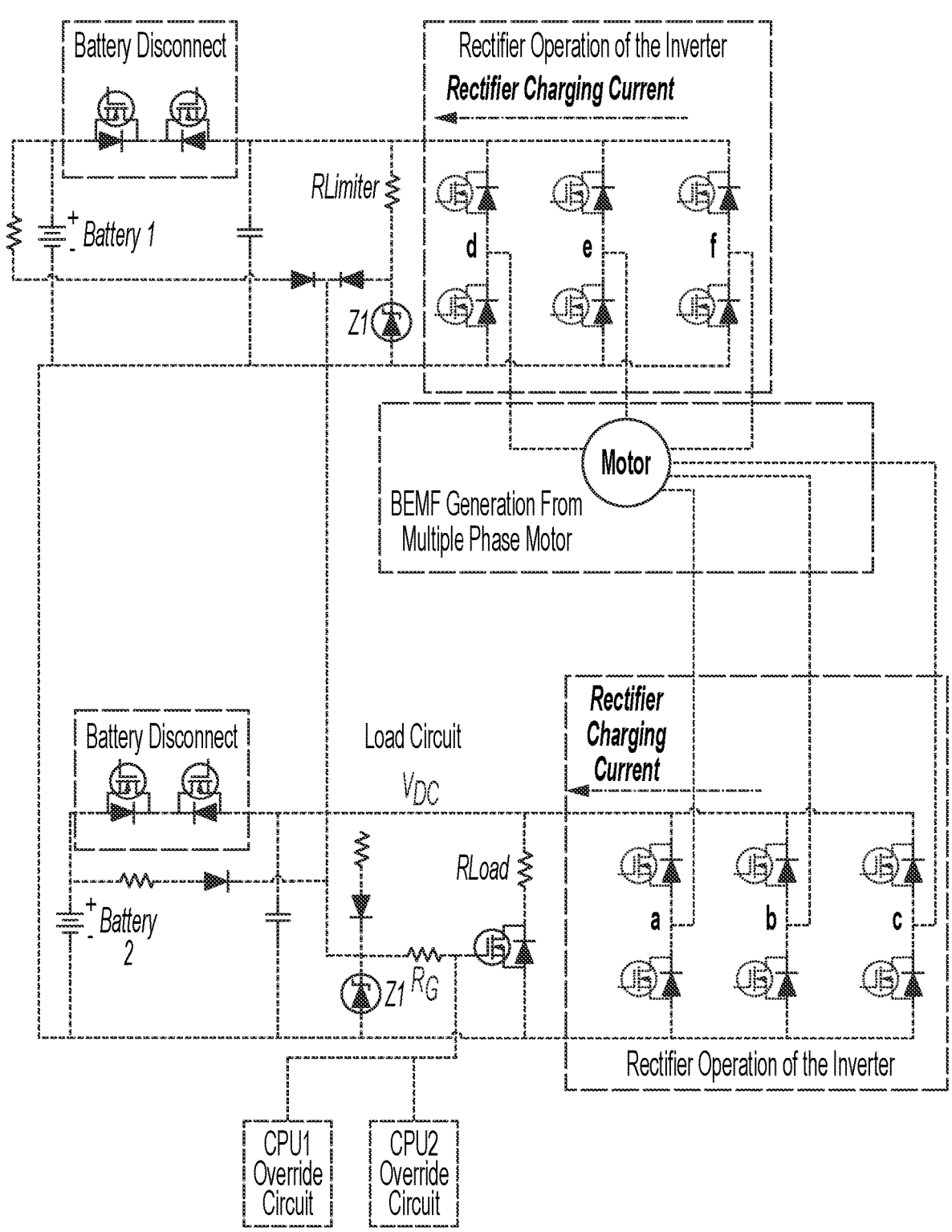
FIG. 16 generally illustrates a circuit diagram of an alternative active damping system according to the principles of the present disclosure.

With reference to FIG. 16, the systems and methods described herein may be configured to provide multi controller base damping on multiphase set motors using either battery power or motor back EMF power circuits. The systems and methods described herein may be configured to use either external power or either motor phase set for back EMF power to switch a resistive load into the rectification path of either inverter to cause damping as a function of handwheel speed in a SbW handwheel system to enable safe operation of the SbW system in case of failure of the controller. The systems and methods described herein may be configured to use battery disconnect circuits for the inverters to limit power dissipation in the load resistance and to prevent loading of the battery when back EMF is greater than the battery voltage. The systems and methods described herein may be configured to overdrive the switch of the load circuit by either controllers to prevent activation when the controller is in normal operation.

Figure 17:
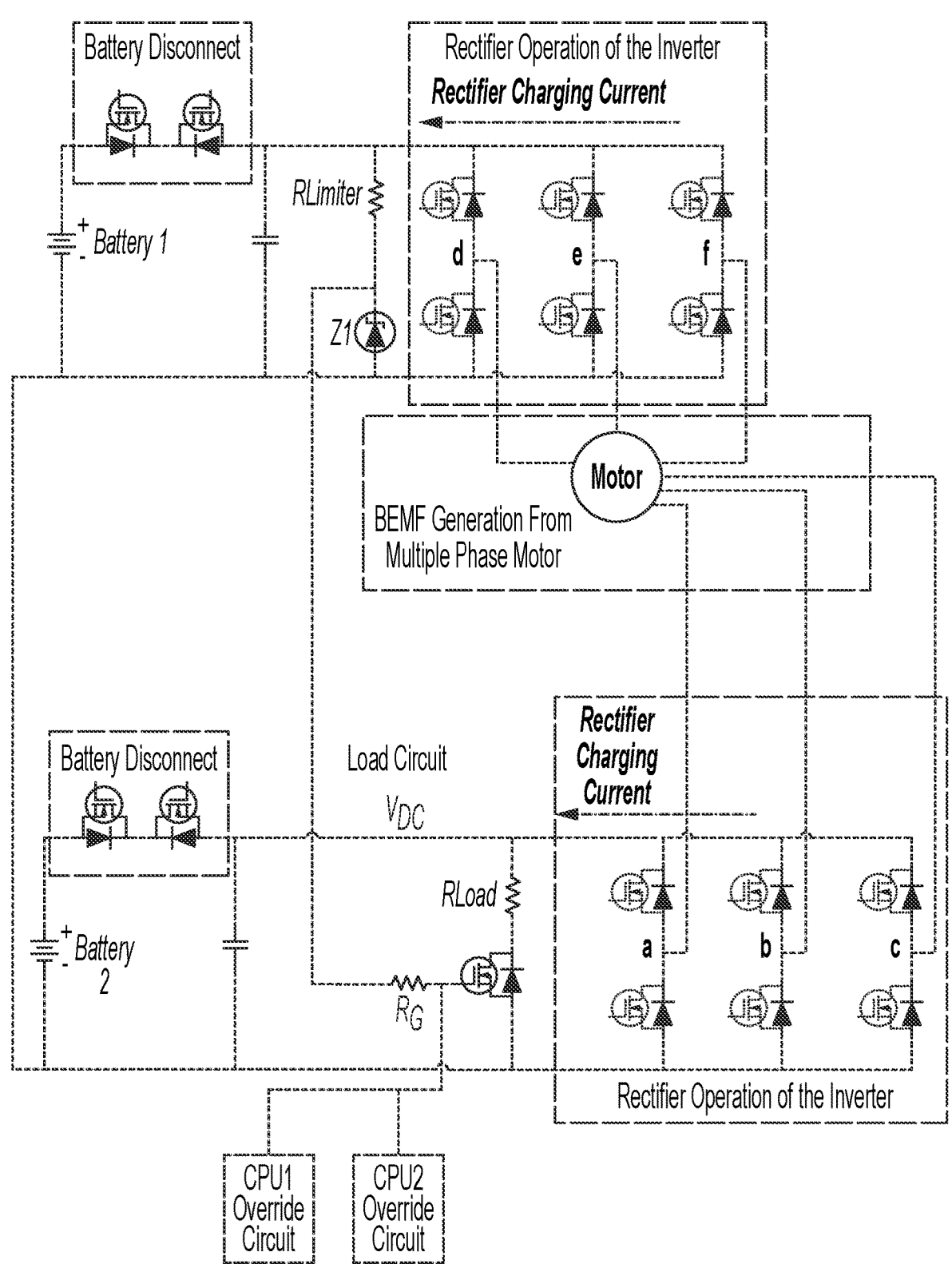
FIG. 17 generally illustrates a circuit diagram of an alternative active damping system according to the principles of the present disclosure.

With reference to FIG. 17, the systems and methods described herein may be configured to provide multi controller base damping on multi-phase set motors having second inverter power bleeder activation. The systems and methods described herein may be configured to provide improved damping at low speed since the bleeder does not affect the rectifier voltage. The systems and methods described herein may be configured to allow each controller to shut off damping. The systems and methods described herein may be configured to use internal motor back EMF power from rectification of one inverter to switch a resistive load into the rectification path of a different inverter to cause damping as a function of handwheel speed in a SbW handwheel system to enable safe operation of the SbW system in case of failure of the controller. The systems and methods described herein may be configured to use battery disconnect circuits for the inverters to limit power dissipation in the load resistance and to prevent loading of the battery when back EMF is greater than the battery voltage. The systems and methods described herein may be configured to overdrive the switch of the load circuit from either controller to prevent activation when the controller is in normal operation.

Figure 18:
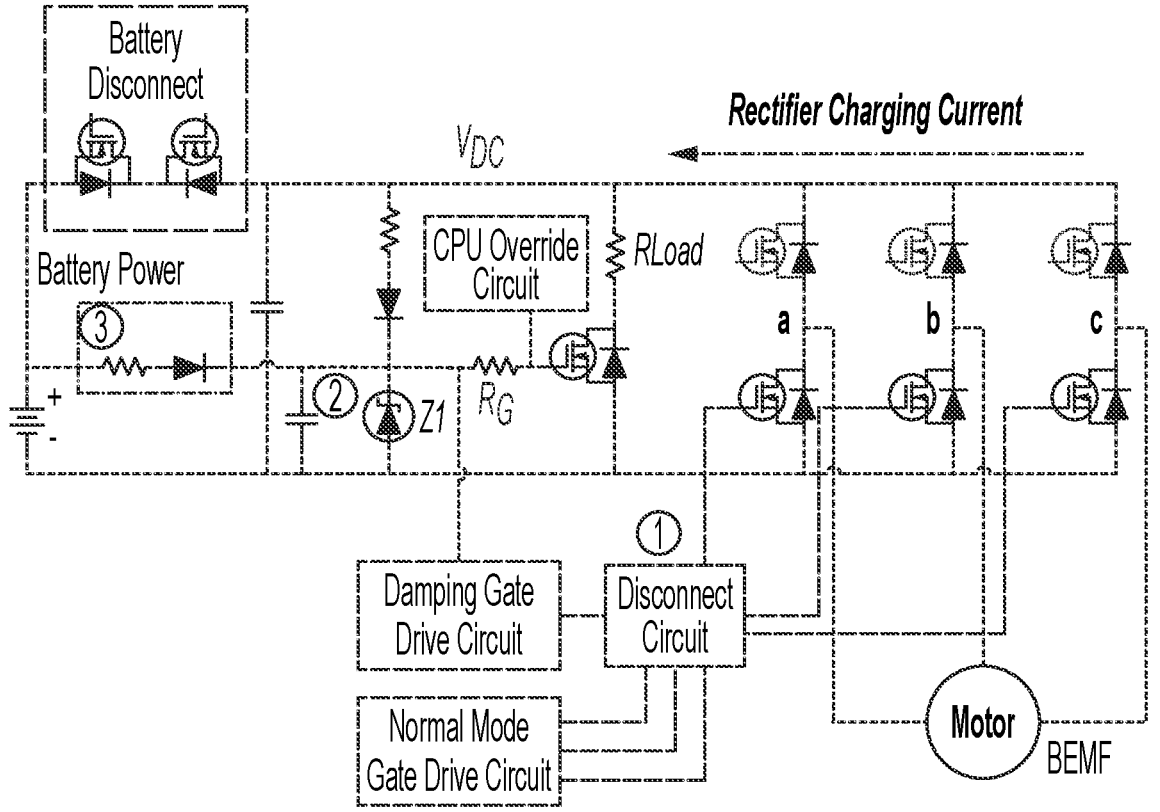
FIG. 18 generally illustrates a circuit diagram of an alternative active damping system according to the principles of the present disclosure.

With reference to FIG. 18, the systems and methods described herein may be configured to use a single controller and inverter. The systems and methods described herein may be configured to provide normal mode gate driver disconnect. The systems and methods described herein may be configured to remove issues with normal mode gated driver interfering with the damping mode. Some gate driver controllers may include drive sink current to prevent the gate of the bridge transistors from becoming enhanced. Disconnecting the gates from the gate driver may prevent over-driving the gate voltage of the damping circuit. The systems and methods described herein may be configured to use bleeder switch circuitry to enhance damping at low handwheel speeds, which may improve performance by increasing damping at less motor speed and when back EMF is used, the gate of the damping transistor may remain enhanced with elimination of any pull-down resistance and addition of capacitance. This may allow the transistor to remain enhanced for a substantial time so that a torque bump does not result in the handwheel. The systems and methods described herein may be configured to use battery power with or without back EMF power, which may allow the transistors to be enhanced without motor speed which will cause the damping to be performed at lower motor speeds. This can be used in conjunction with back EMF to enable damping when a loss of battery exist.

Figure 19:
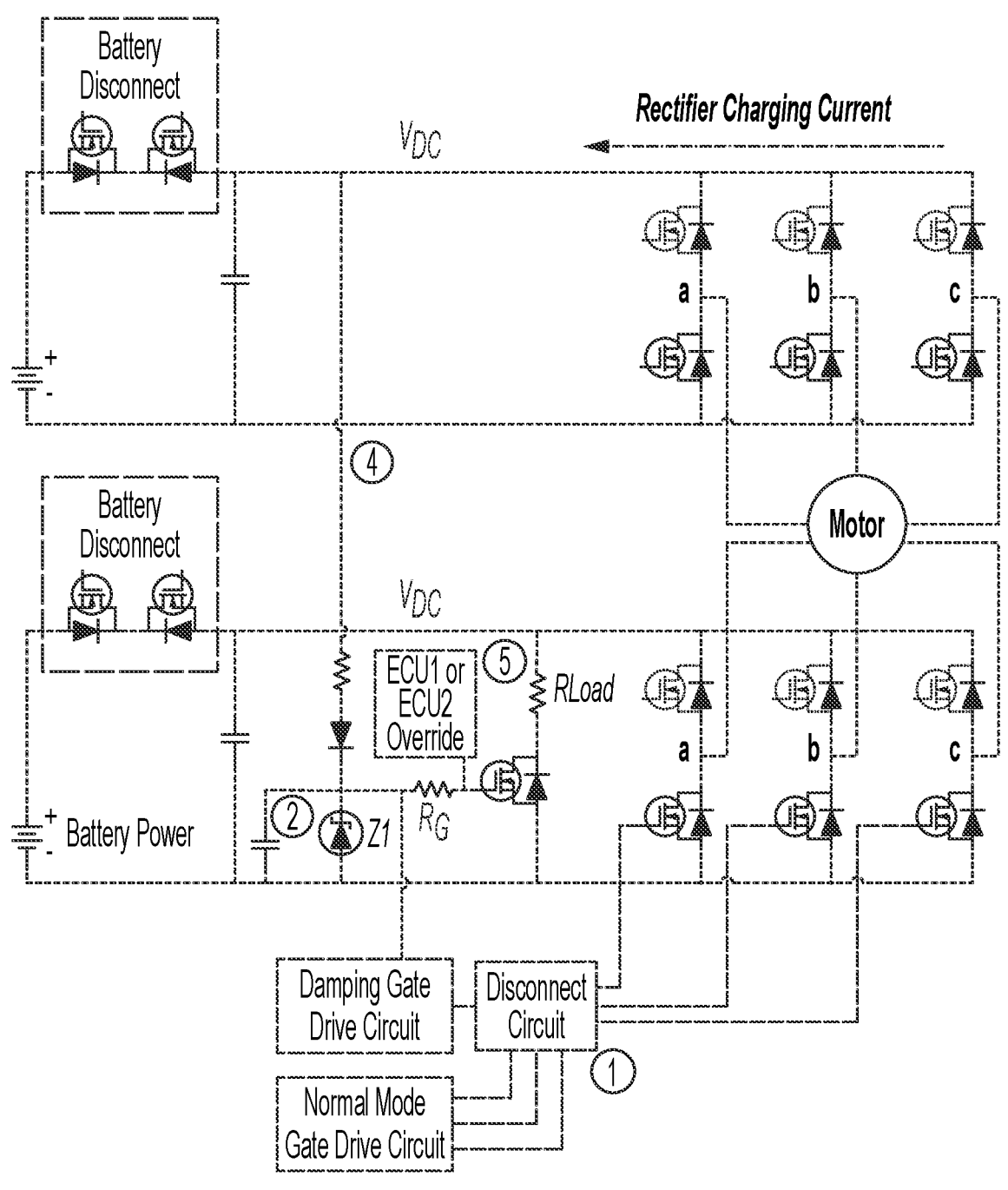
FIG. 19 generally illustrates a circuit diagram of an alternative active damping system according to the principles of the present disclosure.

With reference to FIG. 19, the systems and methods described herein may be configured to provide a dual controller system, which may provide operation of 100% switching of lower MOSFETs with back EMF taken from other controller and phases. The systems and methods described herein may be configured to overdrive the controllers, such that every controller can disable damping. This allows single controller operation without damping so both controllers having to be faulted for damping to activate.

Figure 20:
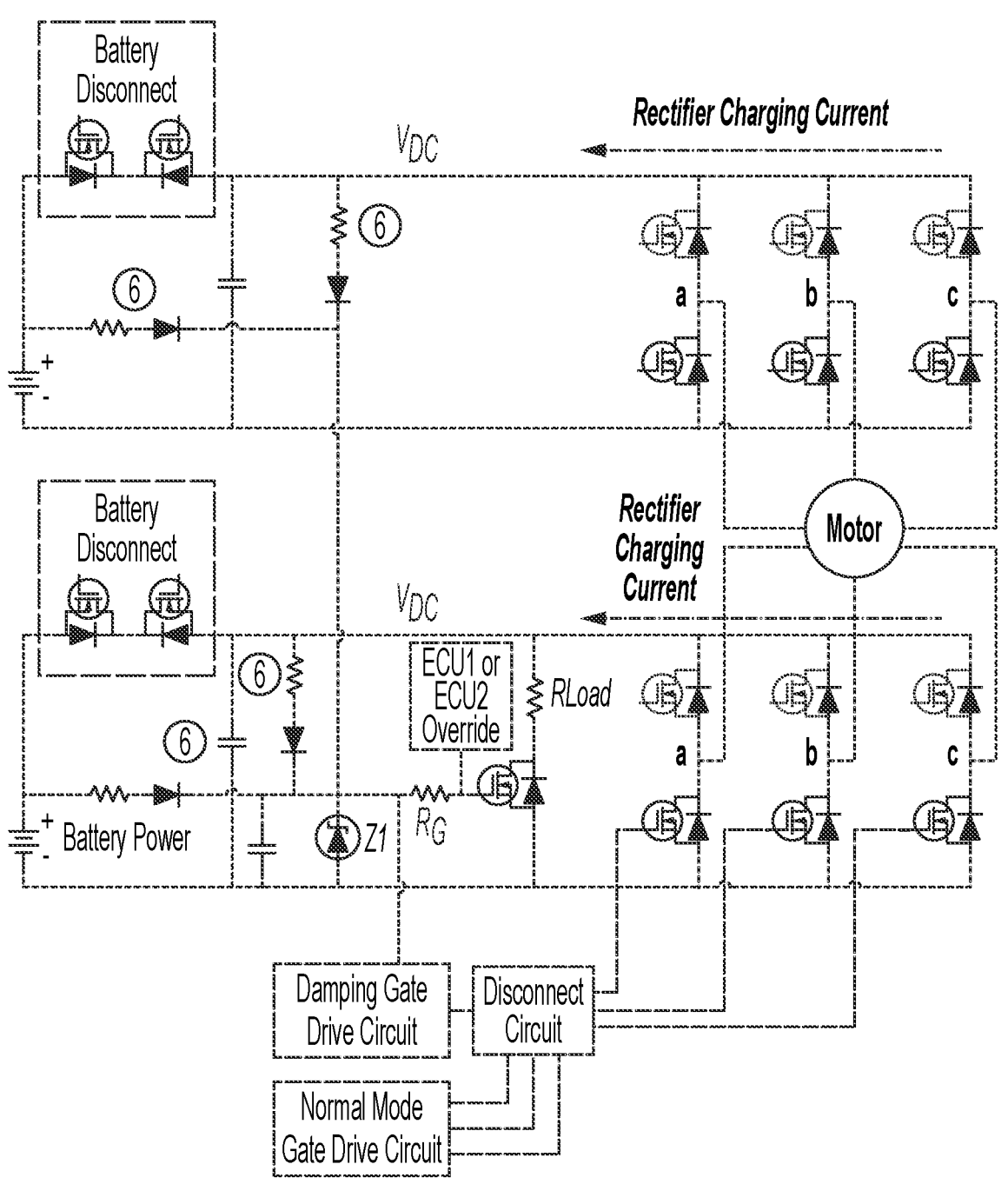
FIG. 20 generally illustrates a circuit diagram of an alternative active damping system according to the principles of the present disclosure.

With reference to FIG. 20, the systems and methods described herein may be configured to provide a dual controller system that uses battery power with or without standard back EMF power to power damping circuit.

Figure 1:
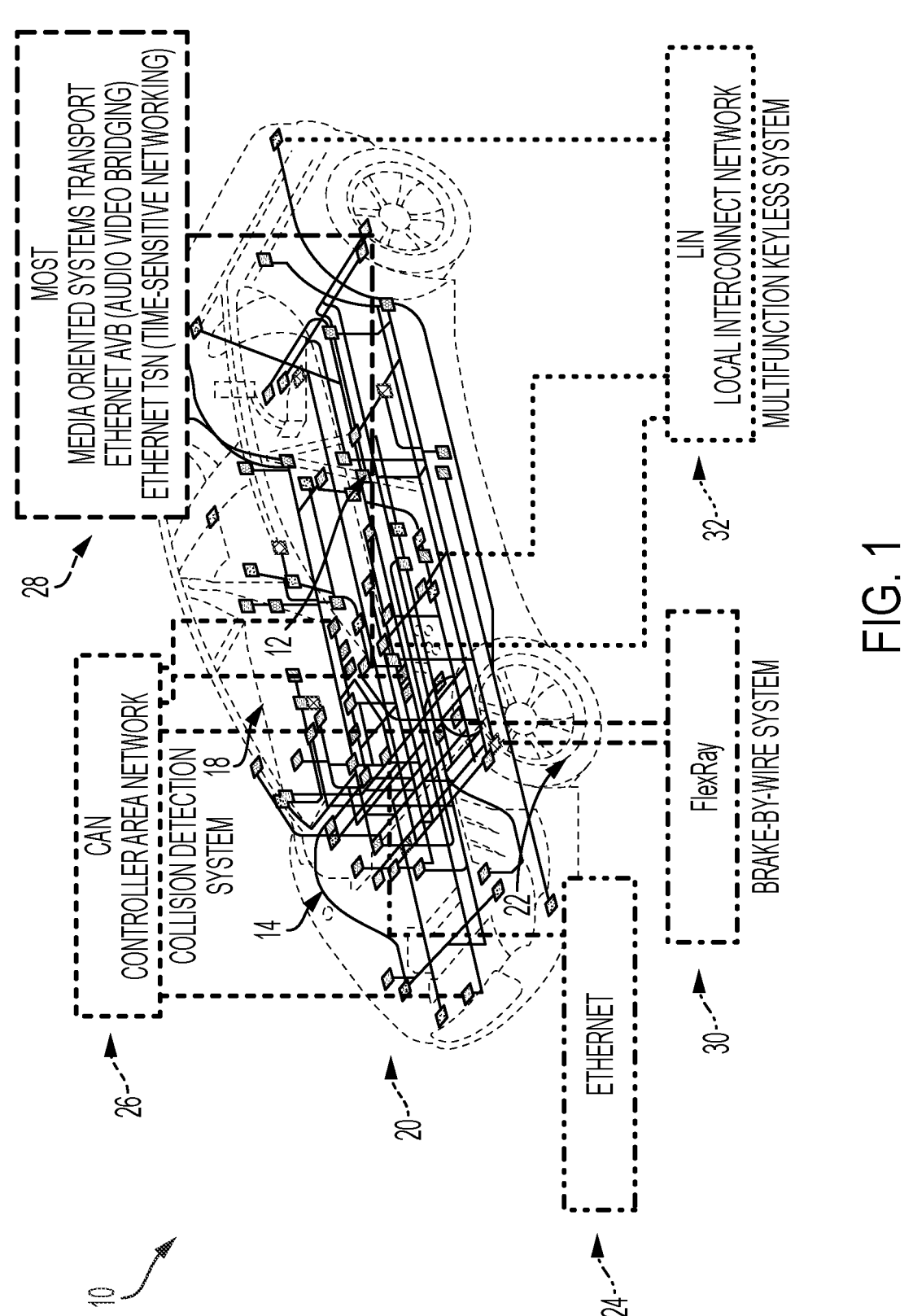
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
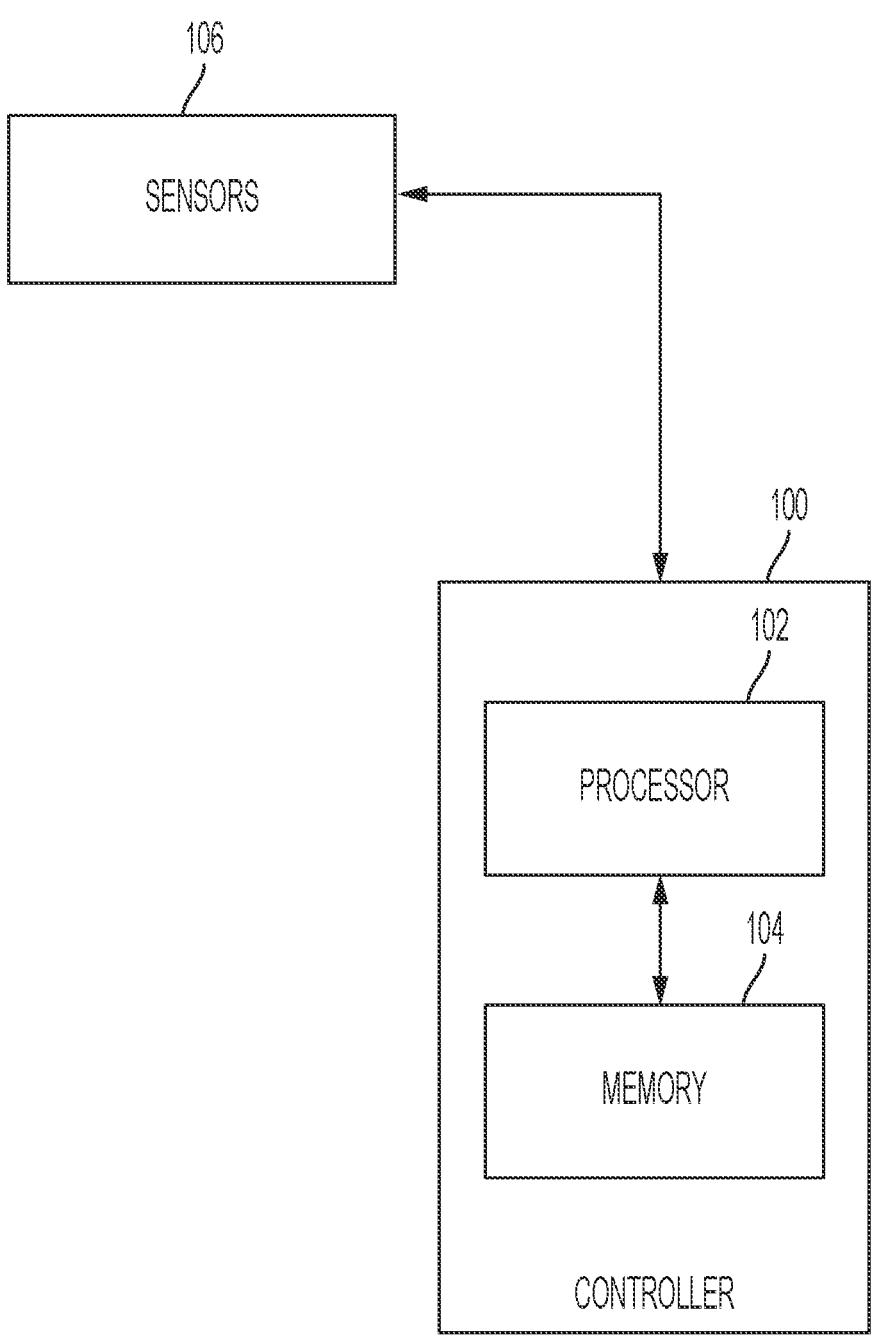
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to, at least, control various functions of the steering system and/or perform any other suitable function, including those of the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

Figure 4:
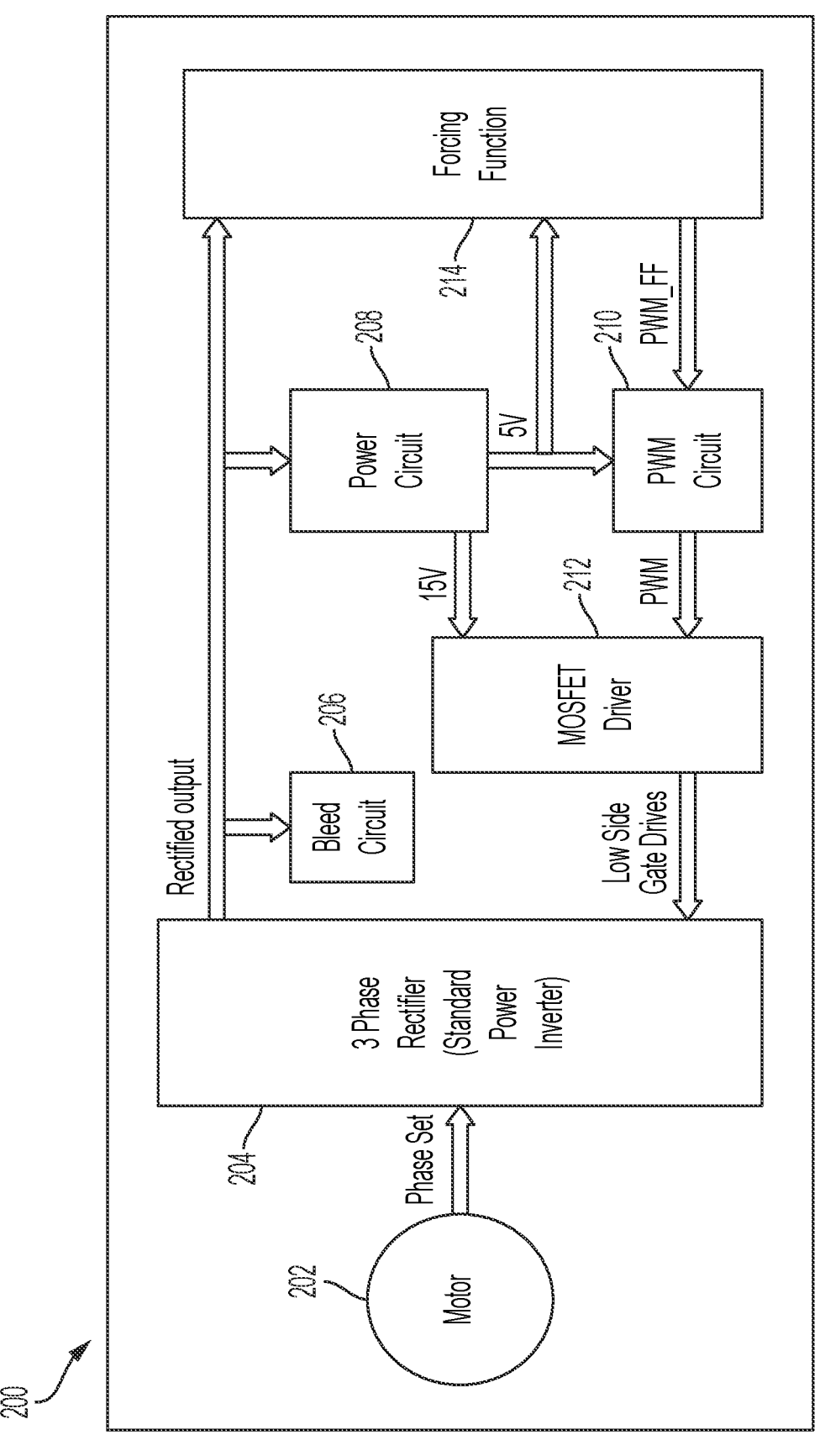
FIG. 4 generally illustrates an active damping system according to the principles of the present disclosure.

In some embodiments, the systems and methods described herein may be configured to provide an active damping strategy using BEMF generated energy, as is generally illustrated as an active damping system 200 in FIG. 4, illustrating an active damping strategy where the battery or primary source is not present. It should be understood that the standard, or common inverter 204 is shown for clarity. The system 200 may be associated with a SbW steering system of the vehicle 10. The system 200 may include a motor 202. The motor 202 may include any suitable motor or machine, such as a surface mounted permanent magnet machine (SMPSM) or other suitable motor or machine. Circular motion on the rotor of the motor 20 may generate a BEMF, where the magnitude of the BEMF depends on the speed of the circular motion. If the handwheel of the vehicle 10 rotates, the handwheel may generate a similar BEMF with the motor speed proportional by the gear ratio to the handwheel. The BEMF may provide the source of energy for the system 200.

Figure 5:
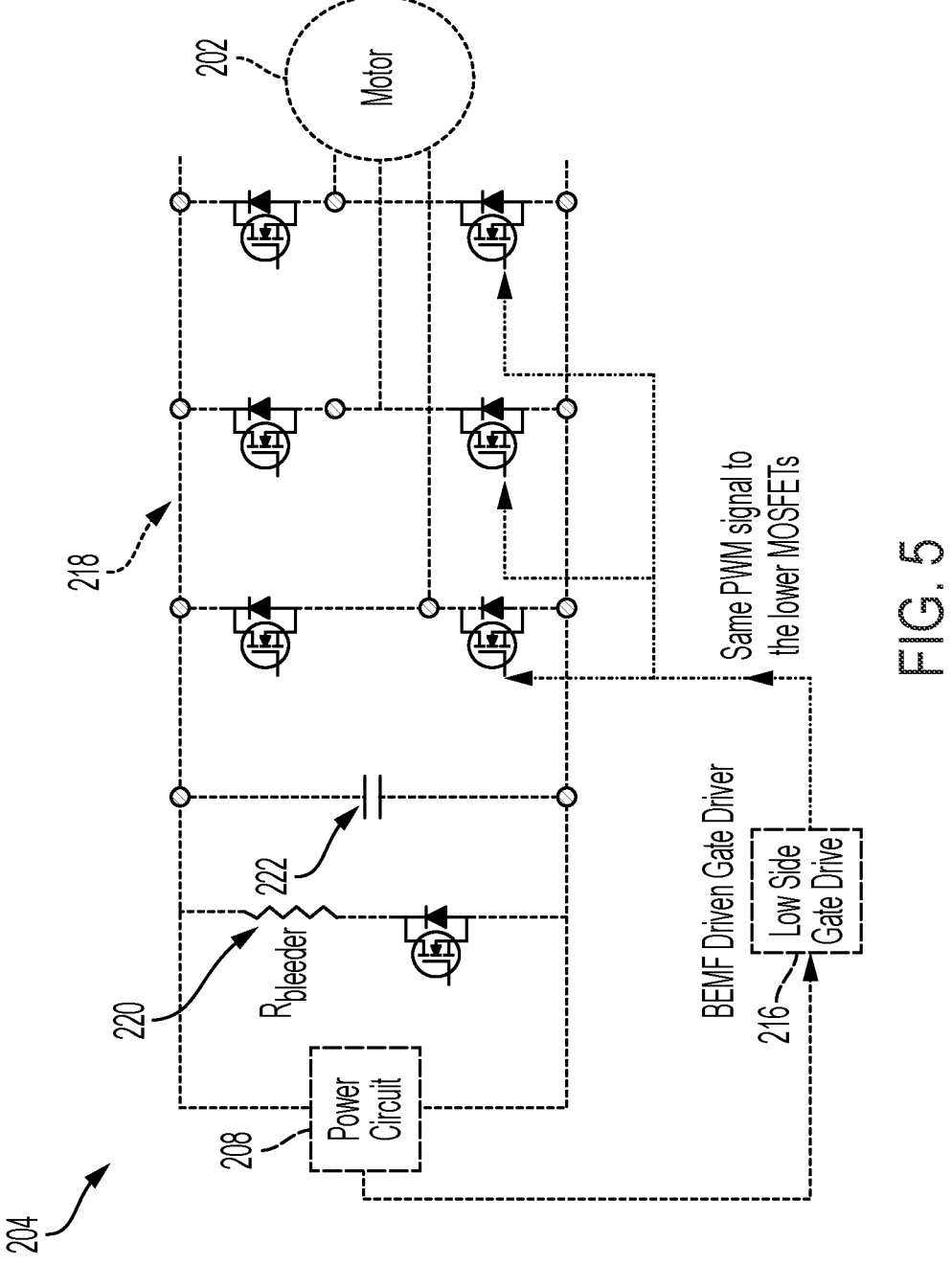
FIG. 5 generally illustrates a circuit diagram of the active damping system according to the principles of the present disclosure.

In some embodiments, the inverter 204, which may include a multi-phase rectifier, operates as a rectifier through the integrated body diodes 218, illustrated in FIG. 5, when the switches in the inverter are off. Damping through the bleed resistor 220 may be present and proportional to the current through the bleed resistor 218. It is important to note that the full damping effect needed could be accomplished by selection of the appropriate bleed resistance 218, but may be limiting. The energy produced in this "bleeder only" scenario for standard damping requirements may be costly and size prohibitive. An improvement to the "bleeder only" option if the torque requirements for damping are higher is to utilize the lower MOSFET's in the bridge to short the phases to produce braking torque, or damping torque. Based on the duty ratio of the MOSFETs and the bleeder, a selection can be utilized to provide a large range of tunable damping. In this proposed strategy, only the lower MOS-FETs 212 in the inverter are used as the active switches to short the motor 202 phase current line-to-line. For clarity, the upper switches could also be utilized for this damping. The power circuits 208 to drive the MOSFETs 212 are also energized from the rectified 204 voltage from the inverter circuit 204. The rectification may be activated when the duty cycle commands the lower MOSFETs 212 off. The bleeder resister 202, which may be associated with bleed circuit 206, is use to provide a path for the current to propagate when the lower MOSFETs 212 are switched off or high voltage spikes result as the current through the motor 202 coils have no path for recirculation.

To have a stable rectified voltage, a secondary bulk capacitor 222 is used across the rectifier 204 which may be combined with the standard primary bulk capacitor so only one capacitor is used. Additionally, or alternatively, the bleeder resistor 220 across the secondary bulk capacitor 222 may be configured to save the capacitor 222 from overcharging due to the BEMF of the motor 202. The bleeder resistor 220 may limit the voltage of the drain to source of the MOSFETs 212 to protect from overvoltage. The selection of voltage ratings to higher voltages may reduce the dependency of the bleeder resistor 220 selection to dissipate more energy to protect the components on the bridge from overvoltage.

In some embodiments, upper MOSFETs of the system 200 may be pulled down and not commanded so only the internal body diodes 218 are used. PWM drive signals are provided to the lower three MOSFETs 216. Additionally, or alternatively, a low side MOSFET 216 may be connected in series with the bleeder resistor 220 and the switch may disconnect the bleeder resistor 220 during the normal operation of the inverter 204, such that the damping will be removed. Otherwise, continuous energy from the power supply 208 (e.g., which may include one or more batteries or any other suitable power source) during normal condition may be dissipated through this bleeder circuit 206. This may provide some extra damping to the system 200 in the off state. The switch on the bleeder circuit 206 may be disconnected when the lower MOSFETs 216 are activated, such that unneeded extra power dissipation of the bleeder circuit 206 does not occur.

A duty ratio of the lower MOSFETs 216 may be controlled (e.g., using the controller 100 or other suitable controller) to achieve the target amount of damping. In some embodiments, if the duty ratio of the lower MOSFETs 216 is 0 percent, none of the MOSFETs 212 are operating. The multi-phase inverter circuit 204 may operate as a multi-phase full wave rectifier and average voltage across the capacitor 222 may be calculated using Equation (1).

$$V_{avg} = \frac{3\sqrt{3}}{\pi} V_m \tag{1}$$

Where Vm is the peak value of the phase voltages Van, Vbn and Von of the BEMF of the motor 202. The power dissipated into the bleeder resistor 220 may be calculated using the Equation (2) where Rbleeder is the value of the bleeder resistance.

$$P_{bleeder} = \frac{V_{avg}^2}{R_{bleeder}} \tag{2}$$

Braking torque due to the bleeder resistor 220 may be calculated as Equation (3) where ωm is the mechanical speed of the motor.

$$\tau_{brake} = \frac{P_{bleeder}}{\omega_m} = \frac{V_{avg}^2}{R_{bleeder} * \omega_m} \tag{3}$$

In some embodiments, if the duty ratio of the lower MOSFETs 216 is 100 percent, all the three lower MOSFETs 216 are ON all the time. As a result, the inverter circuit 204 may be actively damping all the energy during this whole operating region. In this case, all the three phases are shorted. The short circuit currents in the steady-state condition are calculated using Equations (4) and (5) where Ke is the BEMF constant and Np is the number of poles of the machine. Ld, Lq, R, and ωe are the d-axis inductance, q-axis inductance, phase resistance and electrical speed of the of the motor 202, respectively.

$$I_d = \frac{2}{N_p} \frac{\omega_e^2 L_q K_e}{R^2 + \omega_e^2 L_d L_q} \quad (4)$$

$$I_q = -\frac{2}{N_p} \frac{\omega_e K_e R}{R^2 + \omega_e^2 L_d L_q} \quad (5)$$

Combining these two equations, the braking torque in this steady-state condition are calculated as Equation (6) where Np is the number of poles in the motor 202.

$$\tau = -\frac{3}{N_p} R K_e^2 \omega_e \frac{R^2 + \omega_e^2 L_q^2}{\left(R^2 + \omega_e^2 L_d L_q\right)^2} \quad (6)$$

In some embodiments, when the duty is maintained between 0 percent and 100 percent, for the turned ON condition of the lower MOSFETs 216, the inverter 204 operates as a short circuit and for the turned OFF condition of the lower MOSFETs 216, the inverter 204 operates as a multi-phase full wave rectifier. However, for a single switching cycle of the lower MOSFETs 216, the inverter 204 operates a neither as a fully shorted phase condition nor as a full wave rectifier in any switching cycle. Therefore, neither of the presented Equations (3) and (6) can be directly utilized to calculate the total braking torque of the motor 202 due to the BEMF. However, the braking torque in this condition can still be calculated using the various mathematical equations. Based on the inverter 204 and motor 202 model in the simulation platform such as MATLAB/Simulink, the d-axis and q-axis phase voltages can be calculated as Equations (7) and (8), respectively where Ke is the BEMF constant and Np is the number of poles of the motor 202. Ld, Lq, R, and ωm are the d-axis inductance, q-axis inductance, phase resistance and mechanical speed of the of the motor 202, respectively.

$$V_d = L_d \frac{di_d}{dt} + R i_d + \frac{N_p}{2} \omega_m L_q i_q \quad (7)$$

$$V_q = L_q \frac{di_q}{dt} + R i_q - \frac{N_p}{2} \omega_m L_d i_d + K_e \omega_m \quad (8)$$

Moreover, the braking torque can also be calculated based on the simulation using Equation (9).

$$\tau = \left[ \frac{3}{2} K_e i_q + \frac{3}{4} N_p (L_q - L_d) i_d i_q \right] \quad (9)$$

In some embodiments, the inverter 204 may include or be in communication with multiple controllers including, but not limited to, the controller 100 and/or any combination of other controllers or processors. Additionally, or alternatively, the inverter 204 may comprise multiple phases.

In some embodiments, controller 100 may be configured to use the BJT 302 or other suitable transistor to provide damping characteristics to the steering system of the vehicle 10. The BJT 302 may include an NPN BJT or other suitable BJT. The controller 100 may receive a torque signal corresponding to a torque applied to the handwheel of the vehicle 10. The controller 100 may generate a damping signal based on the torque signal. The controller 100 may selectively control current flow to the BJT 302 based on the damping signal. It should be understood that the systems and methods described herein may be configured to use any suitable transistor instead of and/or in addition to the BJT 302. Additionally, or alternatively, the systems and methods described herein may be configured to use any suitable number of transistors, including one or more BJTs 302 or other suitable transistor combination.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

FIG. 6 is a flow diagram generally illustrating an active damping method 400, according to the principles of the present disclosure. At 402, the method 400 provides a multi-phase inverter circuit associated with a motor. The multi-phase inverter circuit may include a power circuit and at least one bipolar junction transistor. For example, the multi-phase inverter circuit may include the circuit 300 and the at least one bipolar junction transistor may include the BJT 302. The controller 100 may be configured to use the circuit 300 and the BJT 302.

At 404, the method 400 receives a torque signal corresponding to a torque applied to a handwheel. For example, the controller 100 may receive the torque signal corresponding to the torque applied to the handwheel of the vehicle 10.

At 406, the method 400 generates a damping signal based on the torque signal. For example the controller 100 may generate the damping signal based on the torque signal.

At 408, the method 400 selectively controls current flow to the at least one bipolar junction transistor based on the damping signal. For example, the controller 100 may selectively control current flow to the BJT 302.

In some embodiments, a system for active damping include a multi-phase inverter circuit associated with a motor. The multi-phase inverter circuit includes a power circuit, a low side gate drive, a bleeder resistor, and at least one metal-oxide-semiconductor field-effect transistor (MOSFET). The system also includes a processor and a memory. The memory includes instructions that, when executed by the processor, cause the processor to: provide at least one signal to lower MOSFETs of the at least one MOSFET. The at least one signal corresponds to a duty ratio of the lower MOSFETs. In response to the duty ratio of the lower MOSFETs being 0 percent, the multi-phase inverter circuit operates as a multi-phase full wave rectifier. In response to the duty ratio of the lower MOSFETs being 100 percent, the multi-phase inverter circuit actively damps energy provided to the multi-phase inverter circuit. In response to the duty ratio of the lower MOSFETs being between 0 percent and 100 percent: for lower MOSFETs in an on condition, the multi-phase inverter circuit actively damps energy provided to the multi-phase inverter circuit with all three phases of the multi-phase inverter circuit being shorted; and for lower MOSFETs in an off condition, the multi-phase inverter circuit operates as a multi-phase full wave rectifier.

In some embodiments, the multi-phase inverter circuit is associated with a steering system of a vehicle. In some embodiments, the steering system includes a steer-by-wire steering system. In some embodiments, the motor includes a permanent magnet synchronous machine. In some embodiments, the permanent magnet synchronous machine includes a surface mounted permanent magnet machine.

In some embodiments, a system for active damping in a steering system includes a multi-phase inverter circuit associated with a motor. The multi-phase inverter circuit includes a power circuit and at least one bipolar junction transistor. The system also includes a processor, and a memory. The memory includes instructions that, when executed by the processor, cause the processor to: receive a torque signal corresponding to a torque applied to a handwheel; generate a damping signal based on the torque signal; and selectively control current flow to the at least one bipolar junction transistor based on the damping signal.

In some embodiments, the multi-phase inverter circuit is associated with a steering system of a vehicle. In some embodiments, the steering system includes a steer-by-wire steering system. In some embodiments, the motor includes a permanent magnet synchronous machine. In some embodiments, the permanent magnet synchronous machine includes a surface mounted permanent magnet machine. In some embodiments, the bipolar junction transistor includes a negative-positive-negative bipolar junction transistor.

In some embodiments, a method for active damping in a steering system includes providing a multi-phase inverter circuit associated with a motor, the multi-phase inverter circuit including a power circuit and at least one bipolar junction transistor; receiving a torque signal corresponding to a torque applied to a handwheel; generating a damping signal based on the torque signal; and selectively controlling current flow to the at least one bipolar junction transistor based on the damping signal.

In some embodiments, the multi-phase inverter circuit is associated with a steering system of a vehicle. In some embodiments, the steering system includes a steer-by-wire steering system. In some embodiments, the motor includes a permanent magnet synchronous machine. In some embodiments, the permanent magnet synchronous machine includes a surface mounted permanent magnet machine. In some embodiments, the bipolar junction transistor includes a negative-positive-negative bipolar junction transistor.

In some embodiments, a system for active damping includes: at least one inverter circuit associated with a motor; the at least one inverter circuit including a power circuit; a damping circuit that includes at least one of a gate drive, a bleeder resistor, and at least one transistor; a processor; and a memory including instructions that, when executed by the processor, cause the processor to: selectively control the damping circuit to provide, using the at least one a low side gate drive, a bleeder resistor, and at least one transistor, damping to an actuator, wherein selectively controlling the damping circuit to provide damping to the actuator includes at least one of: providing at least one signal to the at least one transistor, wherein: the at least one signal corresponds to a duty ratio of the at least one transistor; and disengaging the bleeder resistor In some embodiments, in response to the duty ratio of the at least one transistor being 0 percent, the at least one inverter circuit operates as a multi-phase full wave rectifier. In some embodiments, in response to the duty ratio of the at least one transistor being 100 percent, the at least one inverter circuit actively damps energy provided to the at least one inverter. In some embodiments, in response to the duty ratio of the at least one transistor being between 0 percent and 100 percent: for lower transistors in an on condition, the at least one inverter circuit actively damps energy provided to the at least one inverter circuit with all phases of the at least one inverter circuit being shorted; and for lower transistors in an off condition, the at least one inverter circuit operates as a multi-phase full wave rectifier. In some embodiments, the actuator includes a handwheel actuator of a steering system of a vehicle. In some embodiments, the steering system includes a steer-by-wire steering system. In some embodiments, the motor includes a permanent magnet synchronous machine. In some embodiments, the permanent magnet synchronous machine includes a surface mounted permanent magnet machine.

In some embodiments, a method for active damping includes: providing at least one signal to lower transistors (of at least one transistor associated with a multi-phase inverter circuit associated with a motor, wherein: the at least one signal corresponds to a duty ratio of the lower transistors; in response to the duty ratio of the lower transistors being 0 percent, operating the multi-phase inverter circuit as a multi-phase full wave rectifier; in response to the duty ratio of the lower transistors being 100 percent, actively damping energy provided to the multi-phase inverter circuit; and, in response to the duty ratio of the lower transistors being between 0 percent and 100 percent: for lower transistors in an on condition, actively damping energy provided to the multi-phase inverter circuit with the phases of the multi-phase inverter circuit being shorted; and for lower transistors in an off condition, operating the multi-phase inverter circuit as a multi-phase full wave rectifier.

In some embodiments, the multi-phase inverter circuit is associated with a steering system of a vehicle. In some embodiments, the steering system includes a steer-by-wire steering system. In some embodiments, the motor includes a permanent magnet synchronous machine. In some embodiments, the permanent magnet synchronous machine includes a surface mounted permanent magnet machine.

In some embodiments, an apparatus for active damping includes: a multi-phase inverter circuit associated with a motor; the multi-phase inverter circuit includes a power circuit, a low side gate drive, a bleeder resistor, and at least one transistor; and a controller configured to provide at least one signal to lower transistors of the at least one transistor, wherein: the at least one signal corresponds to a duty ratio of the lower transistors.

In some embodiments, in response to the duty ratio of the lower transistors being 0 percent, the multi-phase inverter circuit operates as a multi-phase full wave rectifier. In some embodiments, in response to the duty ratio of the lower transistors being 100 percent, the multi-phase inverter circuit actively damps energy provided to the multi-phase inverter circuit. In some embodiments, in response to the duty ratio of the lower transistors being between 0 percent and 100 percent: for lower transistors in an on condition, the multi-phase inverter circuit actively damps energy provided to the multi-phase inverter circuit with all three phases of the multi-phase inverter circuit being shorted; and for lower transistors in an off condition, the multi-phase inverter circuit operates as a multi-phase full wave rectifier. In some embodiments, the multi-phase inverter circuit is associated with a steering system of a vehicle. In some embodiments, the steering system includes a steer-by-wire steering system. In some embodiments, the motor includes a permanent magnet synchronous machine.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for active damping, the system comprising
at least one inverter circuit associated with a motor; the at least one inverter circuit including a power circuit;
a damping circuit that includes at least one of a gate drive, a bleeder resistor, and at least one transistor;
a processor; and
a memory including instructions that, when executed by the processor, cause the processor to:
selectively control the damping circuit to provide, using the at least one gate drive, the bleeder resistor, and the at least one transistor, damping to an actuator, wherein selectively controlling the damping circuit to provide damping to the actuator includes at least one of:
providing at least one signal to the at least one transistor, wherein: the at least one signal corresponds to a duty ratio of the at least one transistor;
determining whether a back electromotive force value associated with the motor is greater than a batter voltage value of an associated battery; and
in response to a determination that the back electromotive force value associated with the motor is greater than the battery voltage value of the associated battery, disengaging the bleeder resistor.

2. The system of claim 1, wherein, in response to the duty ratio of the at least one transistor being 0 percent, the at least one inverter circuit operates as a multi-phase full wave rectifier.

3. The system of claim 1, wherein, in response to the duty ratio of the at least one transistor being 100 percent, the at least one inverter circuit actively damps energy provided to the at least one inverter.

4. The system of claim 1, wherein, in response to the duty ratio of the at least one transistor being between 0 percent and 100 percent: for lower transistors in an on condition, the at least one inverter circuit actively damps energy provided to the at least one inverter circuit with all phases of the at least one inverter circuit being shorted; and for lower transistors in an off condition, the at least one inverter circuit operates as a multi-phase full wave rectifier.

5. The system of claim 1, wherein the actuator includes a handwheel actuator of a steering system of a vehicle.

6. The system of claim 5, wherein the steering system includes a steer-by-wire steering system.

7. The system of claim 1, wherein the motor includes a permanent magnet synchronous machine.

8. The system of claim 7, wherein the permanent magnet synchronous machine includes a surface mounted permanent magnet machine.

9. A method for active damping, the method comprising:

providing at least one signal to lower transistors of at least one transistor associated with a multi-phase inverter circuit associated with a motor, wherein: the at least one signal corresponds to a duty ratio of the lower transistors;

in response to the duty ratio of the lower transistors being 0 percent, operating the multi-phase inverter circuit as a multi-phase full wave rectifier;

in response to the duty ratio of the lower transistors being 100 percent, actively damping energy provided to the multi-phase inverter circuit;

in response to the duty ratio of the lower transistors being between 0 percent and 100 percent:

for lower transistors in an on condition, actively damping energy provided to the multi-phase inverter circuit with the phases of the multi-phase inverter circuit being shorted; and for lower transistors in an off condition, operating the multi-phase inverter circuit as a multi-phase full wave rectifier;

determining whether a back electromotive force value associated with the motor is greater than a batter voltage value of an associated battery; and in response to a determination that the back electromotive force value associated with the motor is greater than the battery voltage value of the associated battery, disconnect the multi-phase inverter circuit.

10. The method of claim 9, wherein the multi-phase inverter circuit is associated with a steering system of a vehicle.

11. The method of claim 10, wherein the steering system includes a steer-by-wire steering system.

12. The method of claim 9, wherein the motor includes a permanent magnet synchronous machine.

13. The method of 12, wherein the permanent magnet synchronous machine includes a surface mounted permanent magnet machine.

14. An apparatus for active damping, the apparatus comprising a multi-phase inverter circuit associated with a motor, the multi-phase inverter circuit includes at least one of a power circuit, a high side gate drive, a low side gate drive, a bleeder resistor, and at least one transistor; and a controller configured to:

provide at least one signal to or high side transitions and low side transistors of the at least one transistor, wherein: the at least one signal corresponds to a duty ratio of the lower transistors;

determine whether a back electromotive force value associated with the motor is greater than a batter voltage value of an associated battery; and in response to a determination that the back electromotive force value associated with the motor is greater than the battery voltage value of the associated battery, disconnect the multi-phase inverter circuit.

15. The apparatus of claim 14, wherein, in response to the duty ratio of the lower transistors being 0 percent, the multi-phase inverter circuit operates as a multi-phase full wave rectifier.

16. The apparatus of claim 14, wherein, in response to the duty ratio of the lower transistors being 100 percent, the multi-phase inverter circuit actively damps energy provided to the multi-phase inverter circuit.

17. The apparatus of claim 14, wherein, in response to the duty ratio of the lower transistors being between 0 percent and 100 percent: for lower transistors in an on condition, the multi-phase inverter circuit actively damps energy provided to the multi-phase inverter circuit with all three phases of the multi-phase inverter circuit being shorted; and for lower transistors in an off condition, the multi-phase inverter circuit operates as a multi-phase full wave rectifier.

18. The apparatus of claim 14, wherein the multi-phase inverter circuit is associated with a steering system of a vehicle.

19. The apparatus of claim 18, wherein the steering system includes a steer-by-wire steering system.

20. The apparatus of claim 14, wherein the motor includes a permanent magnet synchronous machine.

* * * * *